US009002911B2

(12) United States Patent
Anderson et al.

(10) Patent No.: US 9,002,911 B2
(45) Date of Patent: Apr. 7, 2015

(54) FILESET MASKS TO CLUSTER INODES FOR EFFICIENT FILESET MANAGEMENT

(75) Inventors: Owen T. Anderson, St. Thomas, VI (US); Frank B. Schmuck, Campbell, CA (US); Mansi Ajit Shah, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 12/847,937

(22) Filed: Jul. 30, 2010

(65) Prior Publication Data

US 2012/0030265 A1 Feb. 2, 2012

(51) Int. Cl.
*G06F 7/00* (2006.01)
*G06F 17/30* (2006.01)

(52) U.S. Cl.
CPC .... *G06F 17/30091* (2013.01); *G06F 17/30224* (2013.01)

(58) Field of Classification Search
USPC .................................................. 707/705, 822
See application file for complete search history.

(56) References Cited

U.S. PATENT DOCUMENTS

| | | | |
|---|---|---|---|
| 5,828,876 A | 10/1998 | Fish et al. | |
| 5,909,540 A * | 6/1999 | Carter et al. | 714/4.4 |
| 5,918,229 A * | 6/1999 | Davis et al. | 705/27.1 |
| 7,383,378 B1 * | 6/2008 | Rajan et al. | 711/112 |
| 7,386,559 B1 * | 6/2008 | Desai et al. | 1/1 |
| 7,890,469 B1 * | 2/2011 | Maionchi et al. | 707/654 |
| 2005/0010620 A1 * | 1/2005 | Silvers et al. | 707/205 |
| 2006/0129614 A1 * | 6/2006 | Kim et al. | 707/202 |
| 2006/0282479 A1 * | 12/2006 | Johnson et al. | 707/203 |
| 2006/0288055 A1 * | 12/2006 | Johnson et al. | 707/203 |
| 2006/0288080 A1 | 12/2006 | Orszag et al. | |
| 2007/0061487 A1 * | 3/2007 | Moore et al. | 709/246 |
| 2008/0005086 A1 * | 1/2008 | Moore | 707/3 |
| 2008/0225726 A1 | 9/2008 | Brown | |
| 2009/0097406 A1 | 4/2009 | Nilakantan et al. | |
| 2009/0290572 A1 * | 11/2009 | Gonia et al. | 370/350 |
| 2009/0300084 A1 * | 12/2009 | Whitehouse | 707/205 |
| 2009/0327355 A1 * | 12/2009 | Wong et al. | 707/201 |

\* cited by examiner

*Primary Examiner* — Hosain Alam
*Assistant Examiner* — Eliyah S Harper
(74) *Attorney, Agent, or Firm* — Yudell Isidore PLLC; Matthew Talpis

(57) ABSTRACT

A computer-implemented method enables efficient tracking of fileset IDs and inode utilizing a fileset mask and an internal inode mask. A utility dynamically updates the fileset mask and the internal inode mask to enable mapping of the number of one (1) bits in the fileset mask to a fileset identifier (ID) and mapping of the one bits in the inode mask to an inode number for the fileset, as either the number of filesets or the number of inodes required per filesets increases above a next power of two threshold. The one bits within the fileset mask and the internal inode mask are disjoint relative to each other. An external inode number is mapped to a corresponding fileset and to a corresponding inode number by concatenating individual bits of the external inode number corresponding to each one (1) bit within the fileset mask and the inode mask.

25 Claims, 10 Drawing Sheets

FILESET MASKS TO CLUSTER INODES FOR EFFICIENT FILESET MANAGEMENT

BACKGROUND

1. Technical Field

The present invention generally relates to an improved data processing system and in particular to an improved method for storing and accessing data files on a data processing system. Still more particularly, embodiments of the present invention relate to a method, apparatus and program product for efficiently storing and accessing data files utilizing inodes.

2. Description of the Related Art

File systems, such as the general parallel file system (GPFS), are utilized for storing and subsequently retrieving electronic data files on a computer system or storage device. These file systems typically utilize a data structure referred to as an inode to provide information related to the location of a corresponding file (within the general storage space) and the attributes and other data related to the stored file. In order to provide easier management of files that are related to a single project, some file systems provide the abstraction of filesets, which are disjoint subtrees of a file system that can be managed separately from each other. One problem with the current fileset implementations is that most data management operations, including snapshots, backups, replication, and information life cycle management (ILM) policy, become much more expensive (with respect to processing resource usage and latency) when applied to individual filesets one-at-a-time, compared to a single operation applied to the file system as a whole. As the conventional implementation of inodes does not provide knowledge about which inode blocks may contain inodes for a particular fileset, a management operation on a single fileset must still read all of the inode blocks of the entire filesytem, and will therefore be just as expensive as applying the same operation to the file system as a whole.

SUMMARY OF ILLUSTRATIVE EMBODIMENTS

Disclosed are a method, a system and a computer program product that enables efficient tracking of fileset IDs and inode numbers in a fileset space. The method is implemented in a data processing system having a processor and access to a storage facility on which one or more filesets are stored, and the method comprises the following processes: a processor executed utility initializing a fileset mask to a first value and an internal inode mask to a second value; the processor executed utility dynamically updating the fileset mask to enable a mapping of the number of one (1) bits in the fileset mask to a fileset identifier (ID) corresponding to a number of filesets received for storage on the storage facility; and the processor executed utility dynamically updating the internal inode mask to enable a mapping of the internal inode mask's one (1) bits to at least a maximum number of inodes required by the filesets received for storage on the storage facility. The one (1) bits within the fileset mask and the internal inode mask are disjoint relative to each other. Also, an external inode number is mapped to a corresponding fileset by concatenating individual bits of the external inode number corresponding to each bit within the fileset mask that is set to one (1) to generate the fileset ID. Finally, the external inode number is mapped to a corresponding internal inode number of the fileset by concatenating individual bits of the external inode number corresponding to each bit within the internal inode mask that is set to one (1) to generate the internal inode number.

In one embodiment, the method further comprises: for a first received fileset, allocating an initial number, s, of lower order bits of the internal inode mask to identify a first size, $2^s$, of internal inodes space that is required to identify the individual files associated with the first received fileset; setting the first n lower order bits of the internal inode mask to one (1); responsive to receiving a next fileset to store within the storage facility: evaluating a function of two (2) raised to the power of a present count of one (1) bits within the fileset mask (f), ($2^f$), which represents a maximum number of filesets that can be individually tracked with f one (1) bits set within the fileset mask; determining whether the next fileset increases a total count of filesets being tracked by the fileset mask to greater than $2^f$; and when the next fileset does not increase the total count of filesets to greater than $2^f$: storing the fileset with a fileset ID corresponding to the value of the total count; and continuing to track the fileset with the fileset mask having f one (1) bits set.

When the next fileset does increase the total count of filesets to greater than 2f, the method further comprises: setting a next unallocated bit within the fileset mask that is not set within the internal inode mask to one (1); and assigning a next $2^f$ fileset IDs with a value corresponding to the number of one (1) bits within the fileset mask. In one embodiment, the setting of the next unallocated bit comprises: logically ORing the fileset mask and the internal inode mask to generate a binary value having a series of lower order 1 bits; left shifting past the series of lower order 1 bits to a first unallocated (0) bit within the binary value; and setting a bit within the fileset mask corresponding to the first unallocated bit location within the fileset mask to one (1). The intervening bits that are not set to one represent zero (0) bits and f increments to f+1.

In another embodiment, the method further comprises: evaluating a function of two (2) raised to the power of a present count of one (1) bits within the internal inode mask (j), ($2^j$), which represents a maximum number of inodes that are individually addressable within inode space allocated within an inode file to each previously stored fileset; determining whether the next fileset requires a total number of inodes that is greater than $2^j$; and when the next fileset does not require a total number of inodes greater than $2^j$: assigning files of the fileset to the inodes provided within the inode space allocated to the fileset and utilizing the internal inode numbers determined by the internal inode mask; and continuing to track the number of internal inode numbers required for each received fileset utilizing the internal inode mask having j one (1) bits set.

When the next fileset does require a total number of inodes greater than $2^j$, the method further comprises: setting a next unallocated bit within the internal inode mask that is not set within the fileset mask to one (1); assigning, within the inode file, a next inodes to each inode space of each previously received fileset and to the next fileset; and storing the next fileset with an inode space equal to $2^{(j+1)}$. In one implementation, the setting of the next unallocated bit comprises: logically ORing the fileset mask and the internal inode mask to generate a binary value having a series of lower order 1 bits; left shifting past the series of lower order 1 bits to a first unallocated (0) bit within the binary value; and setting a bit within the internal inode mask corresponding to the first unallocated bit location within the internal inode mask to one (1), wherein intervening bits that are not set to one represent zero (0) bits and j increments to j+1.

In yet another embodiment, the method further comprises: allocating an inode space of a fileset as one or more inode ranges, wherein each range represents a smallest number of inodes that can be assigned to a fileset; and when the next fileset requires a total number of inodes greater than $2^j$, allocating within the inode file, one or more additional inode ranges to each previously stored fileset to double a previous allocation of inode ranges per fileset. The allocation of inode ranges for a fileset within the inode file is not necessarily sequential. Also, filesets that do not utilized their additional inode ranges are provided with the additional inode ranges as reserve inode space to enable the fileset to increase the number of files within the fileset.

In one embodiment, the method comprises: retrieving an inode block size established for the file system; determining how many inodes can be stored in a block by considering the inode size; dividing the inode number by the number of inodes per inode block to generate an inode block number; performing the mapping between the external inode number and the internal inode number using the internal inode mask and the inode block number in lieu of the inode number.

Finally, in one embodiment, the method provides: identifying a received fileset as a sub-fileset; assigning the sub-fileset to a same fileset ID as a previously stored fileset; sharing an inode space of the previously stored fileset with the sub-fileset; and assigning one or more unassigned inode numbers from within the inode space of the previously filed fileset to respective one or more files of the sub-fileset.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The claimed subject matter and equivalents thereof will best be understood by reference to the following detailed description of illustrative embodiments when read in conjunction with the accompanying figures, wherein:

DETAILED DESCRIPTION OF AN ILLUSTRATIVE EMBODIMENT

Figure 1:
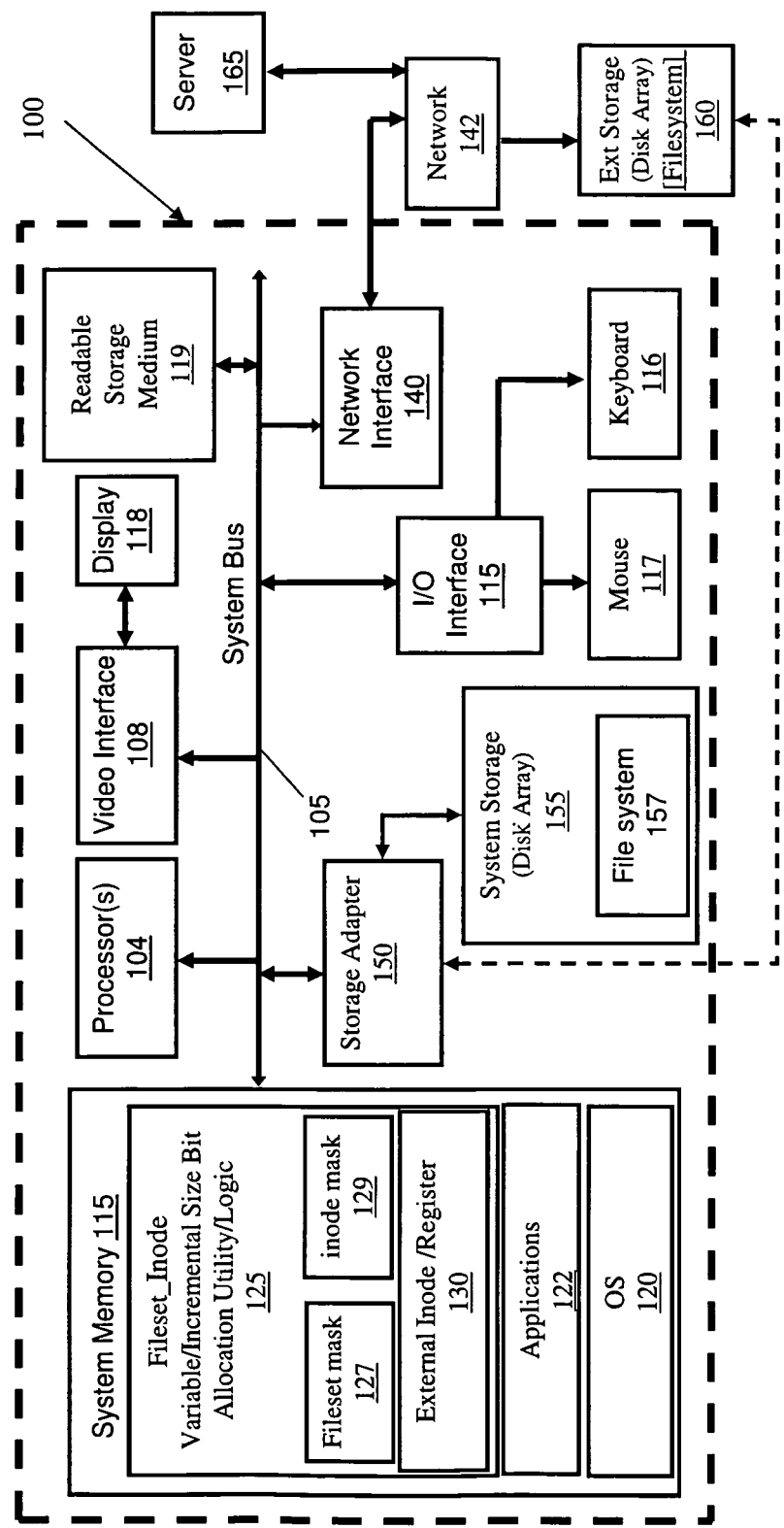
FIG. 1 provides a block diagram representation of an example data processing system with file storage mechanisms according to one embodiment.

The illustrative embodiments provide a method, a system and a computer program product that enables efficient tracking of fileset IDs and inode numbers in a fileset space. The method is implemented in a data processing system having a processor and access to a storage facility on which one or more filesets are stored, and the method comprises the following processes: a processor executed utility initializing a fileset mask to a first value and an internal inode mask to a second value; the processor executed utility dynamically updating the fileset mask to enable a mapping of the number of one (1) bits in the fileset mask to a fileset identifier (ID) corresponding to a number of filesets received for storage on the storage facility; and the processor executed utility dynamically updating the internal inode mask to enable a mapping of the internal inode mask's one (1) bits to at least a maximum number of inodes required by the filesets received for storage on the storage facility. The one (1) bits within the fileset mask and the internal inode mask are disjoint relative to each other. Also, an external inode number is mapped to a corresponding fileset by concatenating individual bits of the external inode number corresponding to each bit within the fileset mask that is set to one (1) to generate the fileset ID. Finally, the external inode number is mapped to a corresponding internal inode number of the fileset by concatenating individual bits of the external inode number corresponding to each bit within the internal inode mask that is set to one (1) to generate the internal inode number.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the following terms are defined as follows:

(a) external inode number: means a N-bit binary number that can be used to identify a fileset ID as well as an internal inode number of the fileset ID. Each different external inode number identifies a different inode within the inode file, whereby it can be located on disk via the usual file access mechanisms. The total number of external inodes supported by a system is $2^{f+j}$ and equal to or less than $2^N$.

(b) fileset mask (mf): means a sequence of binary values (1 and/or 0) in which each bit that is set to one represents a bit in an external inode number that is to be utilized to determine the fileset ID being referenced by the external inode number. When the corresponding bits (matching up to the 1 s of the fileset mask) of the external inode number are concatenated (placed sequentially next to each other to form a binary representation), the binary value is equivalent to the fileset ID that is being referenced by the external inode number.

(c) internal inode mask (mj): means a sequence of binary values (1 and/or 0) in which each bit that is set to one represents a bit in an external inode number that is to be utilized to determine the internal inode number (of a corresponding fileset, which is also identified by the external inode number) being referenced by the external inode number. When the corresponding bits (matching up to the 1 s of the inode mask) of the external inode number are concatenated (placed sequentially next to each other to form a binary representation), the binary value is equivalent to the internal inode number that is being referenced by the external inode number.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture with a single processor/processing node illustrated within a single, network-connected, data processing system. The illustrative and described embodiments assume that the system architecture may be scaled to a much larger number of processing nodes, as with a multiprocessor system and/or with a distributed computing system.

With reference now to the figures, and beginning with FIG. 1, there is depicted a block diagram representation of an example data processing system (DPS), as utilized within one embodiment. DPS 100 may be a computer, a portable device, such as a personal digital assistant (PDA), a smart phone, and/or other types of electronic devices that may generally be considered processing devices and which stores and retrieves files utilizing an inode or similar construct. As illustrated, DPS 100 comprises at least one processor (or central processing unit (CPU)) 104 connected to system memory 115 via system interconnect/bus 105. Also connected to system bus 105 is Input/output (I/O) controller/interface 115, which provides connectivity and control for input devices, of which pointing device (or mouse) 121 and keyboard 123 are illustrated. I/O controller/interface 115 may also provide connectivity and control for output devices, of which display 118 is illustrated (coupled via video interface 108). Additionally, a multimedia drive (e.g., compact disk read/write (CDRW) or digital video disk (DVD) drive) and USB (universal serial bus) port may be coupled to I/O controller 120. Multimedia drive and/or USB port or other serial port enable insertion/connection of one or more removable storage device (e.g., optical disk or thumb drive) on which data/instructions/code may be stored and/or from which data/instructions/code may be retrieved. An example storage device is illustrated as readable storage medium 119. DPS 100 also comprises system storage 150 coupled via a corresponding storage adapter 152. System storage 150 may store data/instructions/code including one or more file systems, stored as one or more filesets accessible via corresponding inodes/inode blocks.

DPS 100 is also illustrated with a network interface 140, by which DPS 100 may connect to one or more network accessible devices, such as external storage 160 or server 165. Access to these devices is via one or more networks 142. In the illustrative embodiment, access to external storage 160 may also be via storage adapter 152, which may maintain a communication or (data transfer) link to the external storage 160. Network interface 140 may be configured to operate via wired/or wireless connection to an access point of the network 142. Network 142 may be an external network such as the Internet or wide area network (WAN), or an internal network such as an Ethernet (local area network—LAN) or a Virtual Private Network (VPN). When network 142 is an internal network, such as a LAN, connection to the external network (Internet) may be established with one or more servers (165), which may also provide data/instructions/code for use by or execution on DPS 100, in one embodiment.

In addition to the above described hardware components of DPS 100, various features of the invention are completed/supported via executable software (or firmware) code or logic (and data) stored within memory 115 or other storage (e.g., storage 150), which software code/logic are executed by processor 104 or some other specially assigned processing mechanism for executing that code/logic. Thus, for example, illustrated within memory 115 are a number of software/firmware/logic components, including operating system (OS) 120 (e.g., Microsoft Windows®, a trademark of Microsoft Corp, or GNU®/Linux®, registered trademarks of the Free Software Foundation and The Linux Mark Institute) and applications 122. Also illustrated is Dynamic Extensible Inode number Range Assignment/Allocation (DEIRA) utility 125. DEIRA utility 125 is a fileset/inode storage and retrieval utility which executes within DPS 100 to provide segments of DEIRA logic that performs portions of the incremental and variable allocation of external inode bits for tracking fileset IDs and inodes numbers of a file system within storage (150/160). In one embodiment, DEIRA logic may be provided within storage adapter 152. This embodiment is likely implemented when, or if, the filesets and their associated inodes are stored on internal storage 150 or external storage 160, which are made accessible via code executing within storage adapter 152.

In at least one embodiment, DEIRA utility 125 may be a component of or may be combined with or incorporated within OS 120 as an enhancement to the existing file system management utility that is provided as a part of the OS 120 (or other specialized file system management application). For simplicity, DEIRA utility 125 is illustrated and described as a stand alone or separate software/firmware/logic component, which provides specific functions, as described below. During operation of DEIRA utility 125, two bit masks, fileset mask 127 and Mode mask 129, are generated and extended (with additional bits, as needed) as the files of the filesets are stored within storage (150/160). The functionality associated with each of these dynamically updated software constructs is described in detail below.

In one (alternate) embodiment, an external Mode register 130 may also be maintained and dynamically updated (i.e., additional bit(s) assigned to track fileset ID and Mode numbers) by DEIRA utility, as the number of filesets and/or Mode count per fileset exceeds the previous respective maximum (power of two) number allocated. As provided by the alternate embodiment, the external Mode register is an N-bit software register (or hardware) which maintains a record of the number of bits (of the N bits available) that have been allocated to identify a fileset ID as well as the internal Mode numbers (of the identified fileset) that are assigned to that fileset (or Mode space) within a larger file system. The actual number of bits assigned for tracking the fileset IDs and Mode numbers is dynamically extensible, such that an initial value beginning with the lower order bit (0 bit) up to any combination of interleaved f and j bits, respectively allocated to the fileset ID and Mode numbers, where f+j is equal to or less than N. The external Mode register may be utilized in place of the bit masks by representing the values of the respective masks within a single contiguous register space, which may be expanded as the number of filesets and/or internal Modes increase to the next power of two threshold value (i.e., a value at which another bit has to be assigned in order to track the number of filesets or the number of internal Modes per filesets). In one implementation, the external Mode register tracks a count of the total number of bits allocated (f+j) plus one or the other of the fileset mask or Mode mask. However, by performing a complement of the allocated bits in one mask, a quick determination of the bit values of the other mask can be made. Thus, the use of the single external bit register enables storage of a single set of bits (mask) that may then be used to generate both the fileset ID and the internal Mode numbers.

In one embodiment, certain features associated with DEIRA utility 125 and/or DEIRA utility 125 itself may be available via a software deploying server (e.g., server 165), and DPS 100 communicates with the software deploying server (165) via network 142 using network interface 140. Then, DEIRA utility 145 may be deployed from/on/across the network, via software deploying server (165). With this configuration, software deploying server (165) may perform all of the functions associated with the execution of DEIRA utility 144. Accordingly, DPS 100 is not required to utilize internal computing resources of DPS 100 to execute DEIRA utility 148. Alternatively, software deploying server may enable DPS 100 to download the executable code required to implement the various features of the described embodiments.

In the described embodiment, processor 104 executes DEIRA utility 125 (as well as or in conjunction with OS 120), when an application (122) is performing an operation that targets/accesses the file storage (150/160). In the described embodiments, DEIRA utility 145 enables DPS 100 to perform certain functions when specific code segments are executed by processor 104 and/or by pre-configured storage device processing component. Among the software code/instructions/logic provided by DEIRA utility 345, and which are specific to the invention, are: (a) code/logic for the processor-executed utility initializing a value of a fileset mask and an internal inode mask to zero; (b) code/logic for the processor executed utility mapping one or more filesets and corresponding one or more internal inode numbers to an external inode number by performing the following functions: for a first fileset, allocating a first lower order bits of the internal inode mask (mj) to identify a initial number of internal inodes within the inode range of the first fileset; setting the first s lower order bits of mj to one (1); (c) code/logic for responsive to receiving a next fileset to perform the inode mapping function: determining whether the next fileset increases a fileset count to a number of filesets that is greater than a maximum number of filesets that can be individually tracked by a number of one (1) bits within the fileset mask (mf) expressed as a binary number; and when the next fileset does not increase the count of filesets over the maximum number of fileset that can be tracked by the one bits within mj, mapping the next fileset to an internal inode space using a previously allocated fileset bitmask (mf); when the next fileset increases the count of filesets over the maximum number of fileset that can be tracked with the (1) bits of mf: selecting a next unallocated bit within the both fileset and internal inode masks (logical OR of mj|mf); and setting the next unallocated bit of the fileset mask to one (1); (d) code/logic for, responsive to receipt of a next fileset that requires a larger number of internal inodes that is a power of two greater than the first number of internal inodes: selecting within the internal inode mask (mj) a next sequential bit that has not been previously allocated within either mf or mj as a next bit in the internal inode mask (mj); and setting the next unallocated bit within the internal inode mask to one (1). According to the illustrative embodiments, when processor 104 executes DEIRA utility 125, DPS 100 initiates a series of functional processes that enable the above functional features as well as additional features/functionality. The various features/functionalities are described in greater detail below within the description of FIGS. 2-8.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, different configurations of data processing systems/devices may be utilized containing other devices/components, which may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

The various described embodiments are implemented while keeping existing structures for storing inodes mostly unchanged. The embodiments divide the inode number space into a set of relatively large, disjoint inode number ranges. The embodiments further provide a deterministic function that maps inode number ranges to filesets, so that all inodes within one range belong to the same fileset. Implementation of the dynamically variable allocation of inode space involves first partitioning bits of an N-bit external inode number into two disjoint subsets of bits (referred to hereinafter as "bit masks"), where one set of bits identifies which fileset an inode belongs to and the other set of bits identifies a particular file (inode) within that fileset. The embodiments allow mapping between internal inode numbers and external inode numbers and also enable the inode mapping function to locate inodes in the inode file without the need to maintain an explicit map or table.

Before providing the above functional features of the embodiments, the previously introduced limitation of high processing overhead involved with performing (in the conventional manner) management operations on file systems that include filesets is first reduced by enabling clustering of inodes by fileset. With clustered inodes, performing an inode scan for a single fileset involves only reading a small subset of all inode blocks (of the file system). This clustering of inodes is also essential for supporting snapshots of individual filesets, and allows the use of a much smaller amount of disk space for inode storage than would be needed when inode clustering is not performed. In one embodiment, the inode clusters of different filesets are compacted into the inode number space to give more uniform inode numbers across filesets. The described embodiments are presented with the recognition that the clustering scheme for inodes should also allow a fileset to dynamically expand its number of inodes without having to pre-allocate its entire inode range(s).

In order to appreciate the enhancements and novelty provided by the various embodiments of the invention, an appreciation must first be established of the other methodologies for clustering inodes for filesets. Exploiting inode clustering requires being able to quickly identify and find all inode blocks containing inodes that belong to a particular fileset. Since each file within a file system is identified by an inode number that is unique across all filesets, a normal file system operation must be able to efficiently find the inode of a file when provided with the file's inode number. Conventional methods of clustering data and retrieving the data employ disk data structures such as b-trees or similar indexing methods. Such disk data structures cause significant additional overhead during normal operation, especially for cluster file systems, such as GPFS, where the cost of synchronizing updates to shared data structures among a large set of nodes can become very high.

Conventional storage mechanisms provide a fixed allocation of specific lower order bits and higher order bits in the external inode to define the internal inode numbers and fileset IDs, respectively. With this approach, the file system (and/or computer system) is designed with a fixed, single, range of inode spaces that is assigned to each fileset. That is, the inode number space may be partitioning into separate contiguous ranges of inode numbers for each fileset. With the following description, that range is assumed to be of size R (i.e., each range contains R inode numbers). Also, the file system has n filesets, denoted fset 0, fset 1, ... through fset n−1. Thus, the inode number range [0, R−1] is assigned to files in fset 0, range [R, 2R−1] is used for files in fset 1, [2R, 3R−1] is reserved for fset 2, and so on, with the last range [(n−1)R, nR−1] reserved for fset n−1. In this example, given a particular inode number i, the fileset that the file belongs to can simply be computed as f=floor(i/R), where R is the size of the inode number range reserved for each fileset. Within each fileset, a file can be identified by its position within the range reserved for that fileset, i.e., a number in the range [0, R−1], which position may be referred to as the "internal inode number", and which can be computed as j=i mod R.

With the above example, if R is a power of two ($2^n$, n being an integer), the division and modulo operations can be implemented with bit shifts and masks. For example if $R=2^{20}$ (indicating a range of approximately 1 million inodes per fileset), then fileset identifier (ID) and internal inode number can be computed as:

$$f=i>>20;$$

$$j=i\&((1<<20)-1).$$

Figure 2A:
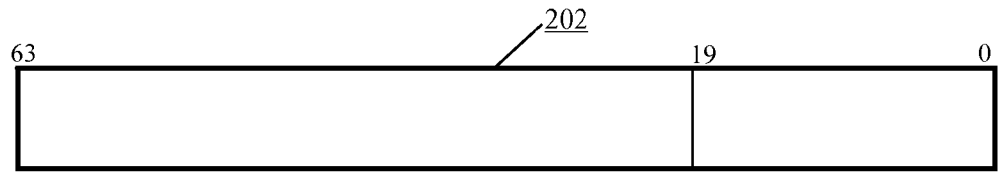
FIGS. 2A-2B illustrate examples of fixed allocation of bits in a 64 bit construct for an external inode, in accordance with one embodiment.
Figure 2B:
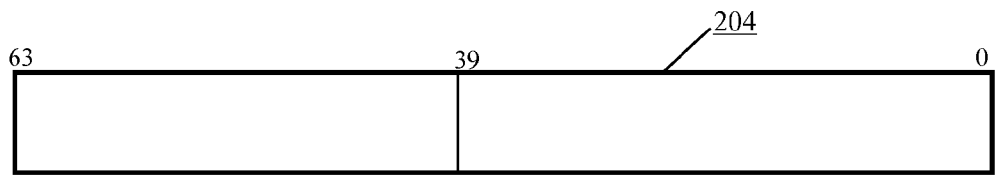

FIGS. 2A and 2B illustrates this fixed allocation of inode numbers and fileset IDs supported by a file system, as represented by an external inode number of size N. Given the movement to 64 bit operations, the external inode number 202/204 is assumed to be a 64 bit number (i.e., N=64), of which all the bits have been allocated to track either the maximum number of inodes per fileset or the maximum number of filesets supported, respectively. With both figures, the first set of values/bits (e.g., lower order bits 0 through 19 FIG. 2A and bits 0-39 FIG. 2B) indicate the inode number, while the second set (higher order bits 20-63 FIG. 2A and bits 40-63 FIG. 2B) indicate the fileset IDs. The utilization of a static, single range, R, per file system presents the disadvantage of a fixed limit being applied to the maximum number of files in each fileset (maximum given by the size of the range (R)). If the inode number space is sufficiently large, it may be possible to chose R big enough to satisfy the requirements of all of the filesets in the file system. For example, if the operating system supports 64-bit inode numbers, the inode number ranges could be defined by using 40 bits of the external inode number (204, FIG. 2B) to identify a file within a fileset (i.e., the internal inode number) and use the remaining 24 bits to identify the fileset that the file belongs to (see FIG. 2B). With this static approach to the bit partitioning, the value of R is equal to $2^{40}$, which provides for up to a trillion files per fileset for up to $2^{24}$ (or 16 million) filesets. As presented by FIGS. 2A and 2B, the value of R is preset for the file system (or computer system) and this default value is static (not changeable) during file system operations. Changes to this value of R would then require system-wide reconfiguration or resetting of the value for R, based on some external input (e.g., a user with administrative privileges).

Figure 3:
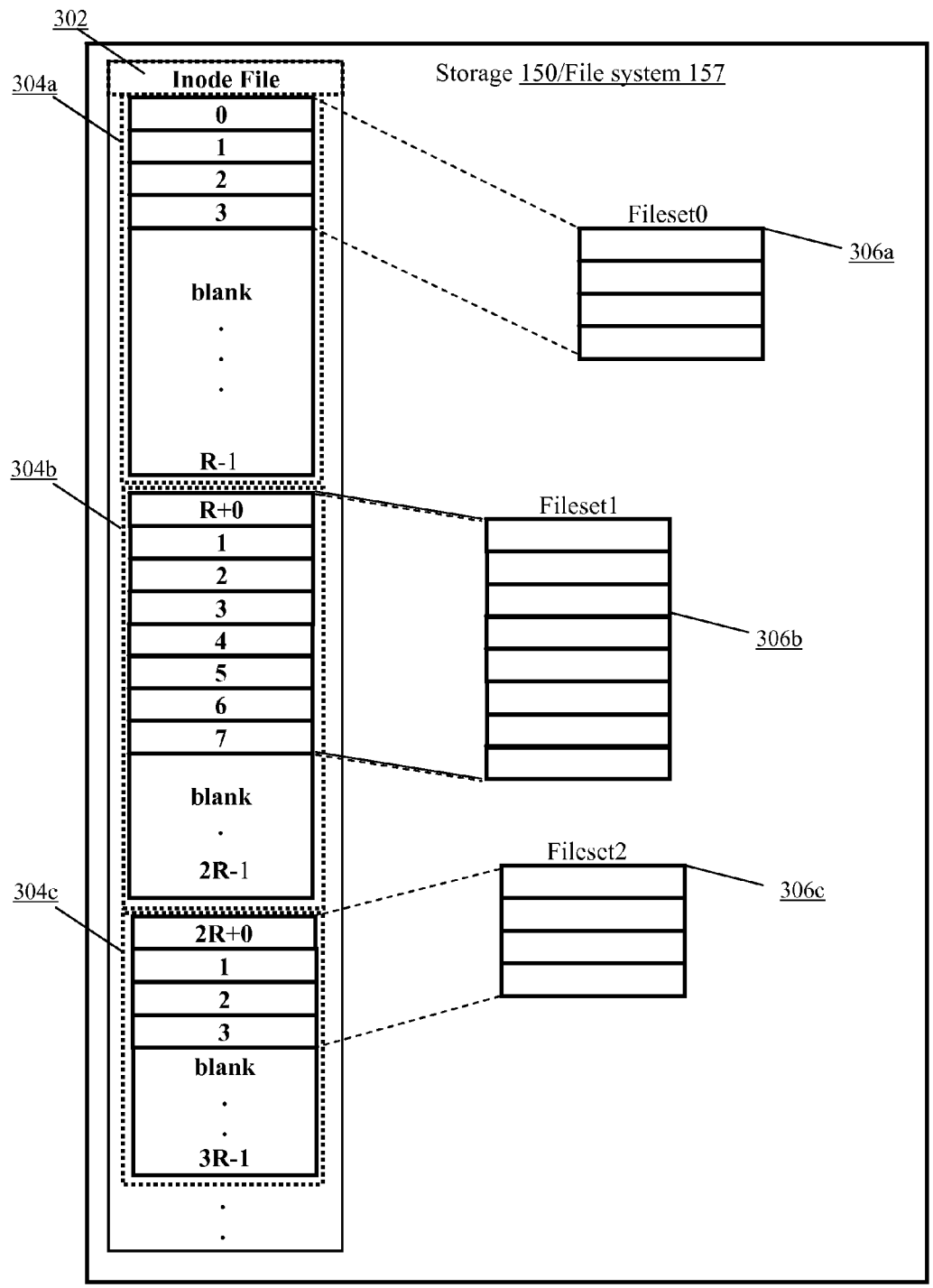
FIG. 3 is a block diagram representation of a storage system with inode file space and corresponding fileset(s) within a system that implements a static block allocation of inode space as provided when using the statically-partitioned external inode construct of FIGS. 2A-2B, in accordance with one or more embodiments.

However, with the above example, reserving a range of inode numbers for each fileset does not mean that the file system must allocate disk space for all of these inodes from the outset. For example and as illustrated by FIG. 3, in (GPFS), inodes are stored in a special metadata file, called the inode file, which is initially created as a sparse file with assigned inode groups/spaces of range R per fileset. An inode with inode number i is stored at logical offset i*I within the inode file, where I is the inode size in bytes. When the application begins to run out of inodes, the file system can dynamically append more inode blocks to the existing space (within R) of that inode grouping within the inode file. This method can be extended to dynamically allocate inode space within the preset range, R, for each fileset as needed. The inode file is created as a sparse file (i.e., lots of empty space between the last inode entered in a range and the first inode of the next range), and then inode blocks are added within each inode number range as needed. Also, when creating a new fileset, the file system will add some number of inode blocks to the existing inode file at an offset i*I, where i is the first inode number in the range reserved for the new fileset. This new range creation will leave a "hole" (i.e., an empty space with no inodes allocated therein) in the inode file (i.e., within the previous range), corresponding to inode numbers reserved for the previous fileset. These reserved inode numbers may never actually be allocated to the fileset, and the inode space remains disjointed.

FIG. 3 illustrates this allocation of inode ranges and the resulting holes that exist in the inode file as a consequence. As shown, inode file 302 includes multiple groupings/clusters of inodes each associated with a respective fileset. Each inode range, R, is represented by an inode space 304 that includes R records (0 to R−1, each indicated as storing a single inode) of which only a first ones are assigned to filesets. Thus, Fileset0 306a, which has four (4) files, are represented by inode range 304a of which only four (4) inodes are assigned, corresponding to the four (4) files. All remaining space (from 4 through R−1) within inode space 304a are blank. When the next fileset, fileset1 306b, is received for storage, a new inode space 304b is created beginning at location R, which marks the start of the next grouping of inodes. As shown, fileset0 and fileset1 have a different number of files and thus a different number of inodes. Each fileset also has a unique grouping of inodes and an inode space of size R. Thus, fileset2 306c also has a similarly configured inode space 304c of similar range, R=(3R−1)−(2R−1), with substantially large holes at the bottom of each inode space.

Embodiments described hereinafter appreciate that the above described static bit partitioning scheme with the external inode number (as illustrated by FIGS. 2A and 2B) as well as the above allocation of static inode ranges within the inode file present a number of disadvantages, including, without limitation:

(1) There is a fixed limit placed on the number of filesets and the number of files per fileset, with no consideration for the actual needs of the application/system. When the operating system only supports 32 bit inode numbers, a fixed bit partitioning makes it impossible to support both a file system that contains a small number of very large filesets as well as a file system with a large number of relatively small filesets. Even with a 64 bit external inode numbers, handling of an extremely large inode number or an extremely large number of filesets may not be possible if the initial static allocation attempts provide some middle ground allocation for each variable.

(2) Inode numbers returned for "stat" and "readdir" system calls will be very large, even though only a much smaller number of inode numbers are actually assigned to files in the filesets. With the above example (FIG. 2B), except for those inode numbers in fileset 0, the smallest inode number starts at "R" and each subsequent fileset is assigned inode numbers that begin with a multiple of R. For operating systems that only support 32 bit numbers, the system of allocating unique inode numbers in ranges of R breaks fairly quickly. Even with systems for which the operating system supports 64 bit inode numbers, some applications may not be designed to handle such large inode numbers. These applications will "break" (e.g., stop executing altogether with a fault/error condition or execute with errors). Notably, these applications may break even if the total number of files in the file system is still very small.

(3) The inode file (302, FIG. 3) becomes a very large, very sparse file, taking up significantly more space than may be required. Even when the inode file does not occupy a lot of disk space, the process of locating inode blocks at large logical offsets within the inode file requires multiple levels of indirect blocks, which is much more than would be required for a dense inode file. The additional levels of indirect blocks then adds overhead to accessing inodes, because of the need to read and cache a larger number of indirect blocks.

The below described embodiments provide solutions to the various problems presented above with clustering of inodes and allocation of inodes in predefined large ranges (R) and the resulting utilization of a fixed allocation of bits within the external inode register. According to the described embodiments, the DEIRA utility executes to provide a function that dynamically assigns extensible inode number ranges to filesets, by dynamically assigning external inode number bits as fileset bits or as internal inode number bits as needed. The mapping between external inode numbers and (fileset identifier (ID), internal inode number) pairs is defined by two disjoint bit masks, fileset mask (mf) and internal inode mask (mj). These bit masks specify which external inode number bits (within external inode 130) represent the fileset ID and which external inode number bits (within external inode 130) represent the internal inode number.

The following example presents an example set of values for the fileset mask (mf), internal inode mask (mj) and external inode number (bits) (i), where a first group of filesets have inode ranges of up to four inodes per fileset (i.e., four files within the filesets), and the last group of filesets have inode ranges of up to 32 inodes per fileset. With this example, up to sixteen (16) filesets are provided, and only the first nine (9) lower order bits of the external inode number/register are required for tracking the fileset IDs and internal inode numbers. In generating the bit masks to represent this structure of filesets and corresponding inodes ranges, the following bit sequences for the bit masks are provided:

mf=001100100
mj=010011011

With the above bit mask sequences, an external inode number contains bits from the fileset ID (f) and bits from the internal inode number (j), interleaved in the following pattern:

i=jffjjfjj

With the present example, only the first eight (8) bits of the external inode register 130 (FIG. 1) are utilized to present the external inode number that is then utilized to identify the fileset ID and locate the inode corresponding to the file within the fileset that is identified by the fileset ID. Thus, assuming the external inode number is presented as 00101001, the DEIRA utility 125 would automatically retrieve the bits masks and provide a reverse interleaving function that would generate the following (fileset ID, inode number) pairing:

(fileset ID=010, inode number=00101)

This would then represent the fifth ($5^{th}$) file within the second ($2^{nd}$) fileset. The following sequence provides an example of the different possible combination of (fileset ID, inode number) pairs that can be generated by processing a five bit external inode number (i.e., 32 unique external inode numbers) with the following bit masks: mf=10100, mj=01011.

| Extino | f | j | f | j | j | fset | j-ino |
|---|---|---|---|---|---|---|---|
| 0 | 0 | 0 | 0 | 0 | 0 | 0 | 0 |
| 1 | 0 | 0 | 0 | 0 | 1 | 0 | 1 |
| 2 | 0 | 0 | 0 | 1 | 0 | 0 | 2 |
| 3 | 0 | 0 | 0 | 1 | 1 | 0 | 3 |
| 4 | 0 | 0 | 1 | 0 | 0 | 1 | 0 |
| 5 | 0 | 0 | 1 | 0 | 1 | 1 | 1 |
| 6 | 0 | 0 | 1 | 1 | 0 | 1 | 2 |
| 7 | 0 | 0 | 1 | 1 | 1 | 1 | 3 |
| 8 | 0 | 1 | 0 | 0 | 0 | 0 | 4 |
| 9 | 0 | 1 | 0 | 0 | 1 | 0 | 5 |

-continued

| Extino | f | j | f | j | j | fset | j-ino |
|---|---|---|---|---|---|---|---|
| 10 | 0 | 1 | 0 | 1 | 0 | 0 | 6 |
| 11 | 0 | 1 | 0 | 1 | 1 | 0 | 7 |
| 12 | 0 | 1 | 1 | 0 | 0 | 1 | 4 |
| 13 | 0 | 1 | 1 | 0 | 1 | 1 | 5 |
| 14 | 0 | 1 | 1 | 1 | 0 | 1 | 6 |
| 15 | 0 | 1 | 1 | 1 | 1 | 1 | 7 |
| 16 | 1 | 0 | 0 | 0 | 0 | 2 | 0 |
| 17 | 1 | 0 | 0 | 0 | 1 | 2 | 1 |
| 18 | 1 | 0 | 0 | 1 | 0 | 2 | 2 |
| 19 | 1 | 0 | 0 | 1 | 1 | 2 | 3 |
| 20 | 1 | 0 | 1 | 0 | 0 | 3 | 0 |
| 21 | 1 | 0 | 1 | 0 | 1 | 3 | 1 |
| 22 | 1 | 0 | 1 | 1 | 0 | 3 | 2 |
| 23 | 1 | 0 | 1 | 1 | 1 | 3 | 3 |
| 24 | 1 | 1 | 0 | 0 | 0 | 2 | 4 |
| 25 | 1 | 1 | 0 | 0 | 1 | 2 | 5 |
| 26 | 1 | 1 | 0 | 1 | 0 | 2 | 6 |
| 27 | 1 | 1 | 0 | 1 | 1 | 2 | 7 |
| 28 | 1 | 1 | 1 | 0 | 0 | 3 | 4 |
| 29 | 1 | 1 | 1 | 0 | 1 | 3 | 5 |
| 30 | 1 | 1 | 1 | 1 | 0 | 3 | 6 |
| 31 | 1 | 1 | 1 | 1 | 1 | 3 | 7 |

According to one embodiment, the following example program code segment of DEIRA utility 125 performs the functions of constructing the external inode number (i). The $n^{th}$ bit of the fileset ID (f) is stored at the bit position (of the external inode register 130) given by the $n^{th}$ one-bit in mf, and the $n^{th}$ bit of the internal inode number (j) is stored at the bit position (of the external inode register 130) given by the $n^{th}$ one-bit in mj. This mapping may be computed with the following C code sequence of bit operations, according to one implementation of DEIRA utility 125:

```
unsigned extino(unsigned f, unsigned j)
{
    unsigned i = 0;
    unsigned iBit = fBif = jBit = 1;
    do
    {
        if (mf & iBit)
        {
            if (f & fBit)
                i |= iBit;
            fBit <<= 1;
        }
        else if (mj & iBit)
        {
            if (j & jBit)
                i |= iBit;
            jBit <<= 1;
        }
        iBit <<= 1;
    }
    while (iBit <= (mf | mj))
    return i;
}
```

According to the described embodiments, and with the above code segment, the bits in the two bit masks, mf and mj, are disjoint and compact (i.e., when the two masks are logically ORed together, they generate a resulting sequence of bits that contains only least significant 1 bits followed by only zero bits). The largest external inode number is given by the logical OR of the two bit masks. Also, two external inodes (e.g., i1 and i2) that contain the same bit values in the bit positions given by the fileset mask belong to the same fileset (see, for example, the above sequences of 32 external inode numbers, where each set of four external inode numbers share the same bit values in the fileset mask). Thus, with the implementation of the described embodiments, instead of a single external inode number range per fileset, the inode mapping assigns a collection of external inode number ranges to each file set, and the size of each range is given by the bit position of the first (low-order) one-bit in mf (e.g., mf=10100 indicates a inode number ranges of four inodes per fileset).

Additionally, with the dynamic allocation scheme provided by the described embodiments, the maximum number of filesets and files per fileset is given by the number of one-bits in mf and mj, respectively. In both instances, the maximum number can be determined as $2^n$, where n is the number of one-bits in the particular mask). With this methodology for allocating/determining external inode numbers for a given fileset and with specific numbers of internal inodes required, DEIRA utility 125 enables the number of filesets and/or the number of files per fileset to be increased as necessary in real time (dynamically) as the numbers surpass the previously assigned maximum for that mask. DEIRA utility 125 enables this dynamic increase by adding another bit to one of the two bitmasks.

Figure 4A:
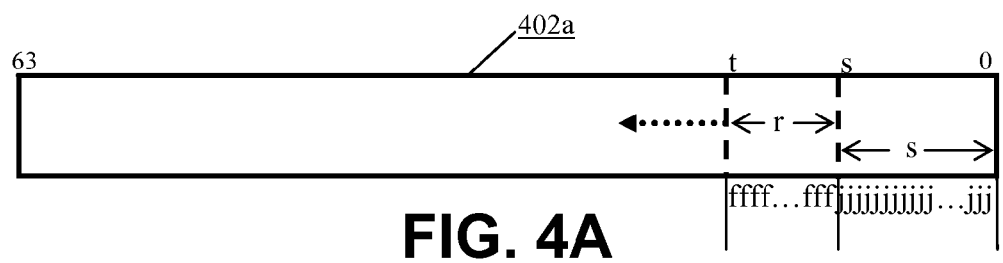
FIGS. 4A-4B illustrate two examples of a dynamically incremental allocation of bits (for fileset ID and internal inode numbers) in a 64 bit construct/register for an external inode, in accordance with one embodiment.

For example, assume a 64 bit external inode register has an initial allocation of (a) bits 0 through 15 representing X inode numbers, (b) bits 16 through 23 to representing Y fileset IDs, and (c) bits 24-63 unused. The values of X and Y are a simple calculation of two (2) raised to the power of the number of bits assigned to each of the two components. Thus, with the given example, the fileset and internal inode allocations begins with a limit of 256 filesets of up to 65536 inodes each. Also, all external inode numbers will be smaller than $2^{24}$. This initial allocation is represented by FIG. 4A, where s, the number of bits initially allocated to mj=15 and r, the number of bits allocated to the first group of filesets, r=t−s (or 23−15)=8. Then the number of filesets would be equal to $2^r$ or $2^{(8)}$. When either a fileset size of greater than 65536 inodes is required or the workload needs more than 256 filesets, the 25th bit (t+1) of the external inode register 130 is assigned to account for the larger fileset ID value or the larger internal inode number, respectively.

Figure 4B:
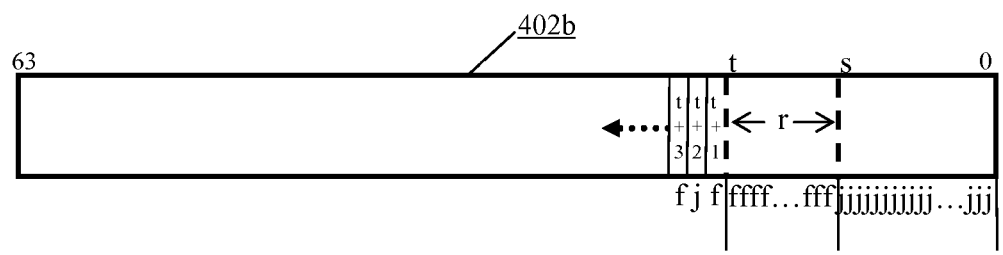

FIG. 4A illustrates an example initial allocation of the external inode bits wherein each of the internal inode bits (labeled "j" for illustration) is initially assigned to s lower order bits of external inode number 402, while the next r higher order bits of external inode number 402 are assigned to map the fileset IDs (labeled "f" for illustration). These bits are shown as the two sets of original bits being assigned sequentially. Following this initial assignment of bits, however, and as described above, as the number of bits required for each of the masks being tracked increases, the next highest order bit that was not previously assigned is assigned to either the internal inode mask or the fileset mask. FIG. 4B illustrates this dynamically extensible functionality with the external inode bit allocation, according to the described embodiments, where additional bits are added to the end of the previously allocated bits for tracking the inode masks and fileset masks. The additional bits may be either f bits or j bits depending on which parameter first reaches/surpasses the next power of two threshold value, as described herein. Specifically, as shown by FIG. 4B another f bit is first appended at bit number t+1, followed by a j bit at t+2, and then an f bit at t+3. The sequence of adding new bits is variable and is based on the file system's need for larger numbers of filesets and/or greater inode space per fileset.

With both of the FIG. 4 representations (FIGS. 4A-4B), the directional arrows and dashed lines indicate that the actual physical allocations of bits is incremental. Also, the higher order bit line (t) is shifted to incorporate additional higher order bits (t+1 . . . ) of the external inode number, as needed, until the combined number of mf and mj reaches the maximum value of the external inode (or bit 64 in the presented illustration).

In the illustrated examples, the internal inode numbers are always assigned with the lower ordered bits of the external inode number set to the minimum inode range assigned to the file system. Also, the fileset IDs are assigned with the next higher ordered bits of the external inode register. As the number of internal inode numbers increases past the next power of two increment, the bit demarcation separating the previously allocated bits from the un-allocated bits is shifted one bit to the right (t=t+1). When the number of fileset IDs reaches the next power of two threshold number, a bit is also allocated at the end of the set of bits utilized to track the fileset IDs within the external inode number.

The methodology by which the mapping to the external inode numbers are constructed provides the advantage of not limiting the inode ranges to a fixed range or limiting the file system to a fixed number of filesets or a fixed number of files in a fileset. Additionally, the methodology enables the external inode numbers of small file systems to remain relatively small. One noticeable benefit to the use of the dynamic mapping function versus the static allocation can be seen with FIG. 5A-5B, which illustrates the resulting inode file constructed with the enhanced functionality of a dynamically extensible allocation of inode number ranges to filesets, as needed. For purposes of these illustrations, an inode range R of four (4) inodes is assumed to be the established minimum space allocation for the file system. The value of R is a design parameter that is configurable and established when the file system is first established. Also, an initial fileset (fileset0) with four files, file1 to file4 is assumed, and is mapped to a first file space of having R inodes. This value of R may be directly linked to the value of s shown in FIGS. 4A-4B, or vice versa, and for practical purposes R may be $2^s$. R is thus the minimum file space that is initially assigned for each fileset until the number of inodes required for a new fileset is larger than R. When this condition occurs, a next inode range is allocated within the inode file to each fileset, in order to accommodate the larger number of inodes required per fileset. This coincides with setting a next higher order bit in mj (after logically ORing mf and mj to locate the next unallocated bit) to 1 in order to track the larger inode space per fileset. For filesets that were initially allocated an initial inode space of R inodes, a second inode range is allocated within the inode file, and represents a reserved space for that fileset to use when/if additional files are later added to that fileset.

Figure 5A:
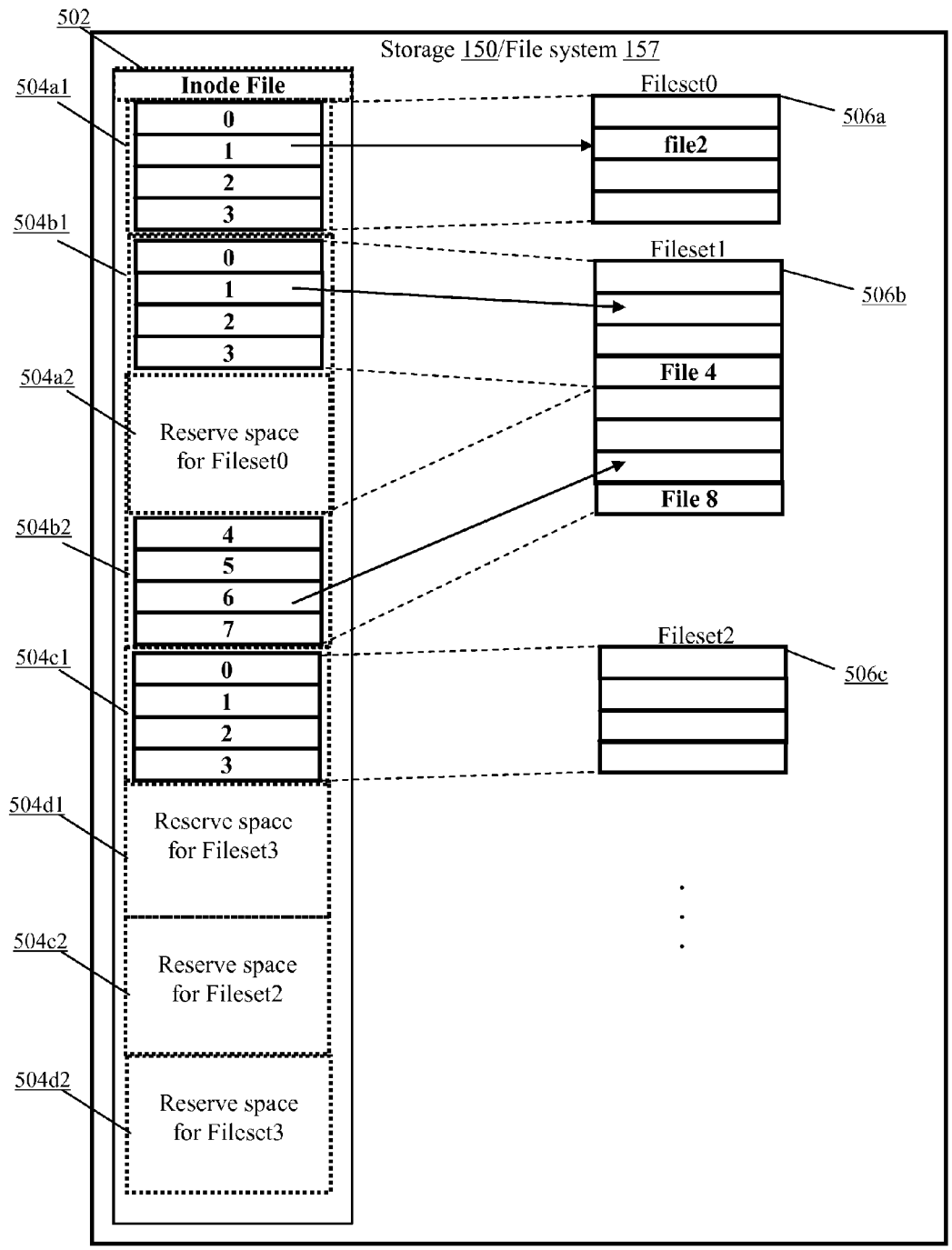
FIG. 5A is a block diagram representation of a storage system with inode file space and corresponding fileset(s) with inode space indexing as provided when utilizing the dynamically extensible external inode mapping functionality, in accordance with one or more embodiments.

Looking specifically at FIG. 5A, in contrast with FIG. 3, each fileset (filset0, fileset1, and fileset2) is assigned inode number spaces that are multiples of R, at the time a larger inode space is required for next fileset. Each fileset is assigned only the amount of inode space within inode file 502 that is required to map to the largest fileset in the file system. Fileset0 506a is the first fileset to populate the files system 157 located in storage 150. Fileset0 506a includes four (4) files and is initially allocated first inode space, which comprises a single inode range 504a1 of R inodes. The next received fileset, fileset1 506b includes eight files and thus requires and is allocated a second inode space comprising two (2) inode ranges 504b1 and 504b2. As the number of inodes assigned to the filesets has increased beyond the value of the single range size of inodes, a reserve inode space 504a2 is allocated in between the two inode ranges of fileset1. When a next fileset, fileset2 506c is received, fileset2 506c is also allocated two inode ranges 504c1 and 504c2, as the previous filesets. Because fileset2 only needs four inodes assigned, only the first range 504c1 of inode space is actually mapped to fileset2, and the second range 504c2 is reserved for later use when/if fileset2 506c increases its number of files. Also shown within inode file 502 are reserve space for the next fileset, which have not yet been received. As shown, inode ranges 504d1 and 504d2 are reserved for the next fileset (which would be fileset3 in the provided sequence). This reservation of two inode ranges 504d1 and 504d2 for fileset3 assumes that flleset3 would have less than eight files. In the event that fileset3 had more than eight files, then a third inode range would have to be assigned to fileset3 as well as to each of the previously received inodes. This would coincide with setting the next unallocated bit in mj to 1 (after logically ORing mf and mj to locate the next unallocated bit). Notably, with the addition of each fileset having fileset ID that is equal to the next higher power of two (e.g., fileset2, fileset4, fileset8, fileset16), the value of mf is also modified by setting a next unallocated bit of mf (after logically ORing mf and mj to locate the next unallocated bit).

Notably, implementation of the functional features of the DEIRA utility easily accommodate the two scenarios of (1) supporting a file system with a few very large filesets and (2) supporting a file system with a very large number of moderately small filesets. Thus, the describe embodiments provides flexibility in handling different configurations of filesets, while still enabling mapping between internal and external inode numbers. Additionally, the described features enable efficient locating of inodes on the inode file without requiring the file system maintain an explicit map or table of the inode locations/positions on the storage. Rather, with the described embodiments, the only information needed to perform the mapping of internal inodes are the two bit masks, mf and mj, that define which external inode number bits represent the fileset ID and which bits represent the internal inode number.

The method performed by the above C code sequence of DEIRA utility 125 is further described with reference to the flow chart of FIG. 6. Additionally, other functional features of the various embodiments are presented within flow charts of FIGS. 7-9. The flow charts described herein illustrate various methods by which the above processes of the illustrative embodiments are completed. Although various features of the methods illustrated in FIGS. 6-9 may be described with reference to components shown in FIGS. 1, 4, and 5, it should be understood that this is merely for convenience and alternative components and/or configurations thereof can be employed when implementing the various methods. Key portions of the methods may be completed by DEIRA utility 125 executing on processor 104 within DPS 100 (FIG. 1) and controlling specific operations of/on DPS 100, and specifically with regards to storage (file system) 150/160, and the methods are thus described from the perspective of either/both DEIRA utility 125 ("utility") and DPS 100 (generally referring to one or more processing components).

Figure 6A:
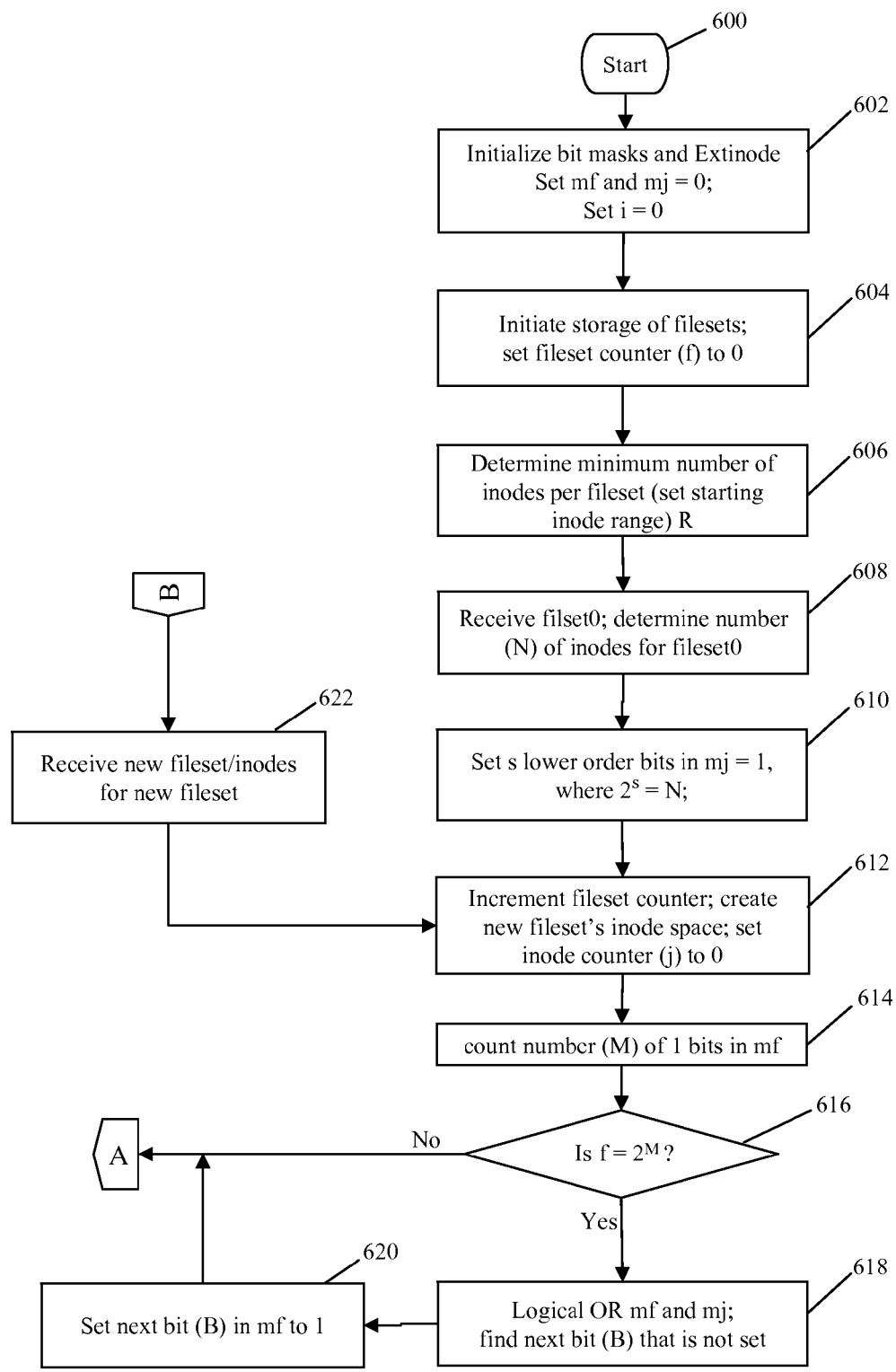
FIG. 6 (A-B) is a flow chart illustrating the method by which the dynamic allocation of external inode number/register bits, which allows mapping between an external inode number and a fileset ID/internal inode number, is completed as the number of filesets and/or inodes per fileset increases above a series of "power of two" threshold values, according to one embodiment.
Figure 6B:
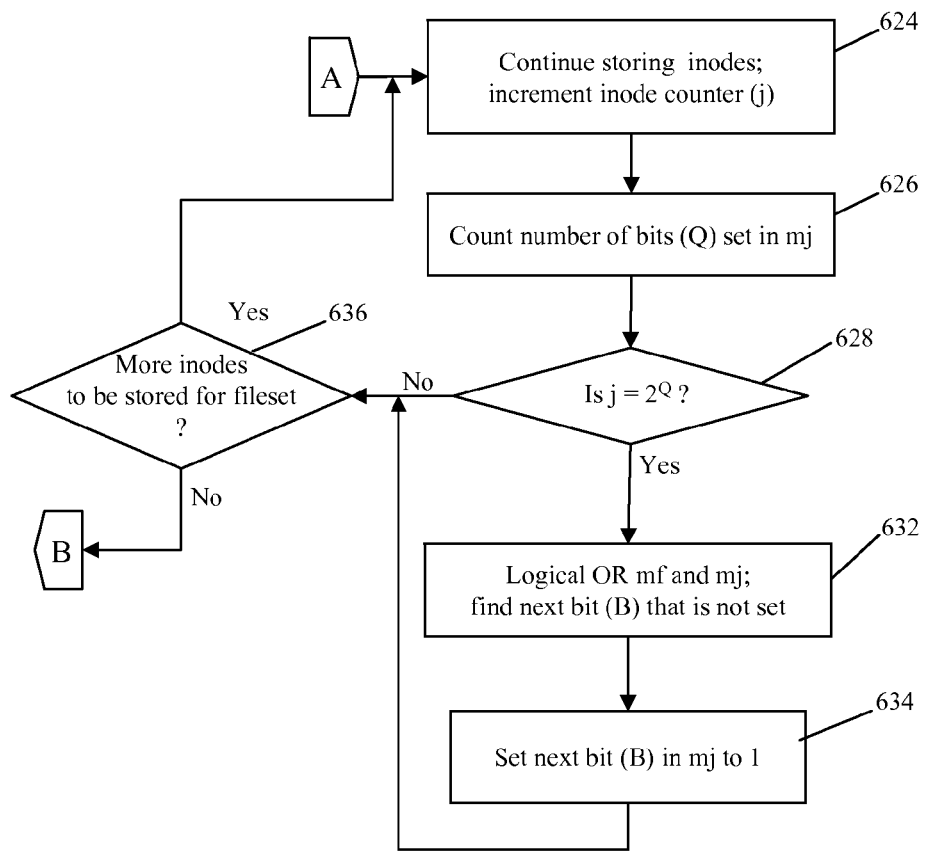

Turning now to the method of FIG. 6, which begins at start block 600, the utility initializes the bit masks, mf and mj, and the external inode, i (by setting all to zero) (block 602). Following the initialization process, the utility receives a first fileset for performing the inode mapping function, and sets the fileset counter (f) to 0, representing fileset0 (f0) (block 604). At block 606, the utility determines the minimum number of inodes (R) per fileset, as the starting inode range. It is appreciated that this value may be pre-established (as a choice) when setting up the file system. The utility then receives the first fileset, fileset0, and the utility determines the number of inodes, N, required for fileset0 (block 608). With the number N determined, the utility sets the "s" lower order bits in mj equal to 1, where $2^s$=N (block 610). The utility increments the fileset counter, creates the new fileset's inode space within the inode file, and sets the inode counter (j) to zero (0) (block 612). At block 614, the utility counts the number (M) of 1 bits in mf, and then determines at decision block 616 whether the value of f is equal to $2^M$. If the value of f is equal to $2^M$, the utility performs a logical ORing of mf and mj in order to find a next bit (B) that is not set in either mask (block 618). The utility then sets the unallocated next bit (B) in mf to 1 to account for this larger number of filesets than previously capable of being track with the number of 1 bits in mf.

In one embodiment, the initialization of the bit masks may also include setting initial values of the masks, where the smallest number of inodes (perhaps corresponding to the value of R) within any fileset is known or predefined. For example, if all filesets begin with a minimum of $2^m$ inodes then the first m bits in mj should be set to 1 s and the corresponding bits in mf should be set to 0. Likewise, it is understood that, with the alternate embodiment, the first available bit (iBit) within the external inode register than can be assigned to either the fileset mask or the internal inode mask is bit m+1.

Returning to FIG. 6 (and specifically 6B), when the value of f is not equal to $2^M$ or following (in flow chart sequencing only) the setting of the next bit in mf to 1, the utility continues storing inodes and increments the inode count (j) for each inode of the fileset (block 624). The utility also counts the number of 1 bits (Q) that are set in mj (block 626), and determines at decision block 628, whether the number of inodes (j) is equal to $2^Q$. When the number of inodes is equal to $2^Q$, the utility performs a logical ORing of mf and mj to locate the next (in sequence) higher order bit (B) that is not allocated in either mask (block 632). The utility then sets the next bit (B) in mj to 1 (block 634). The method then proceeds to decision block 636 at which the utility checks for whether additional inodes remain to be stored for the fileset. If additional inodes remain, the utility continues storing inodes (block 624). However, when all inodes for the fileset have been stored, the utility returns to block 622 (FIG. 6A) at which it waits to receive a new fileset.

Within the above method, in one embodiment, the decisions on when to allocate a new bit to either bit mask may be tracked using a direct count of already assigned bits or counters that are assigned the actual numbers and compared against each other. Regardless, when the utility determines that the count value for either the filesets (f, tracked in in mf) or the inodes (j, tracked in mj) reaches a next order of two value (i.e., $2^n$, for n=1, 2, 3, 4 . . . ), the utility recognizes that an additional 1 bit has to be allocated to the respective mask in order to support the larger number of filesets or inodes. This provides the incremental allocation feature described herein. When the count value is still below the next power of two threshold number, the utility continues to store the filesets and/or inodes using the available fileset space and inode space that can be tracked with the present number of 1 bits set in mf and mj, respectively.

With the above described method, whenever the number of filesets surpasses the next power of two threshold or the number of inodes required by the next fileset is greater than the previous maximum (power of two) number of inodes, a next higher order bit of the external inode is assigned to track either the fileset ID or the inode number, respectively. This incremental addition of mapping bits to the external inode register is illustrated by FIG. 4B.

Figure 7:
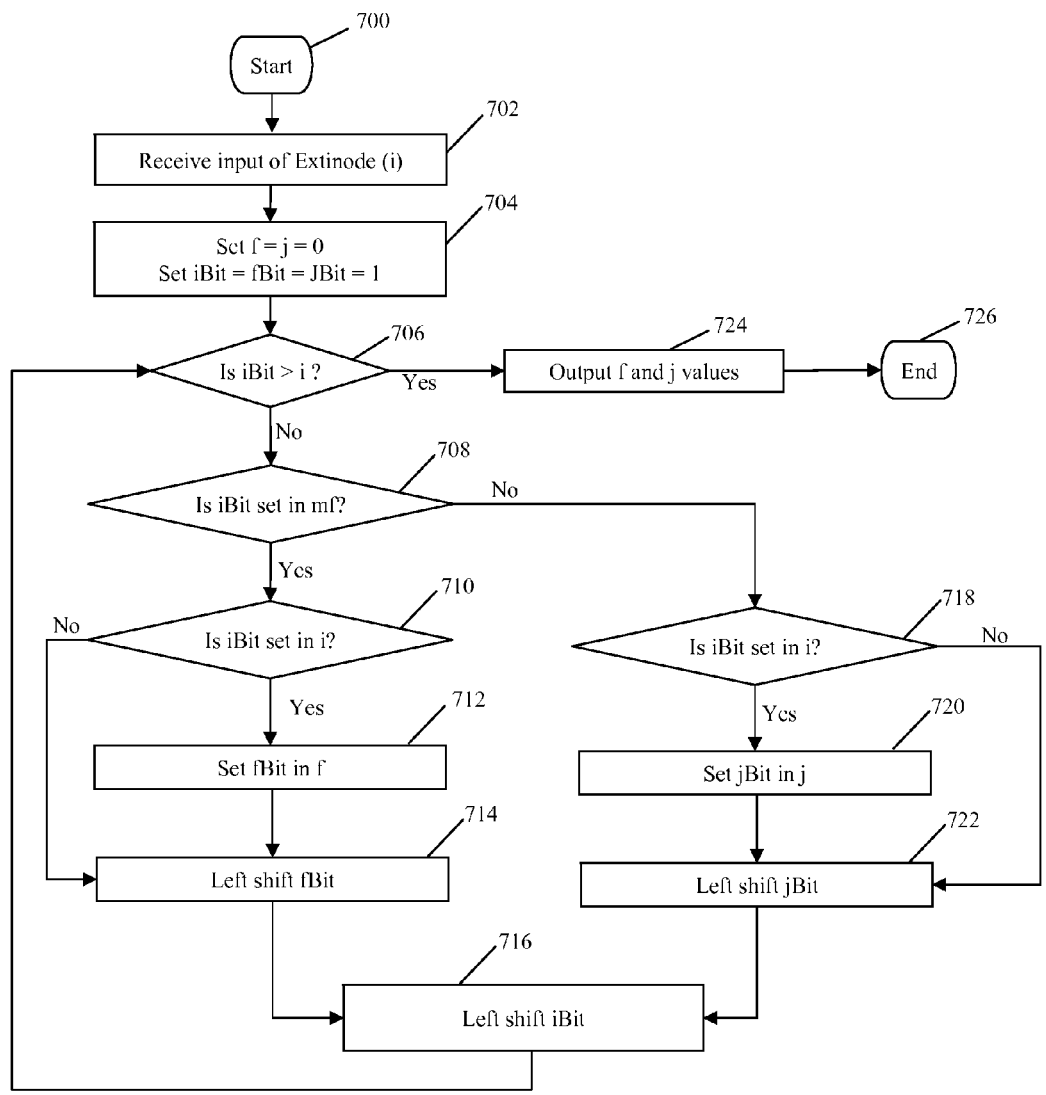
FIG. 7 is a flow chart illustrating the method by which a fileset ID and corresponding inode number are retrieved from an external inode number via a reverse mapping function, according to one embodiment.

Referring now to FIG. 7, there is illustrated a flow chart of the method by which a "splitExtIno" function is implemented (by execution of a corresponding code segment of DRIEVA utility 125, FIG. 1) to partition/split an external inode number, i, into the respective parts of a fileset ID number and an internal inode number. The flow chart is presented with reference to a set of variables, defined as follows:

i=external inode number
f=fileset number
j=internal inode number
mf=fset mask
mj=internal inode mask
ibit=bit position in external inode number (i)
fbit=bit position in fset number
jbit=bit position in internal inode number The method begins at initiation block 700 and proceeds to block 702 at DRIEVA utility 125 receives an input of a particular external inode number, comprising a number of bits. It is appreciated that when performing the below functions of the method, the two masks, mf and mj, are constant (i.e., not being updated) and the input external inode number is not larger (i.e., has a larger number of bits) than the logical OR of mf and mj. The utility sets the values of the fileset number (f) and the internal inode number (j) equal to zero (0), and also sets the values of iBit, jBit and fBit equal to 1 (block 704). A determination is made at block 706 (as part of a recursive function for each new value of iBit) whether the iBit value is greater than the external inode number. The iBit value is left-shifted for each iteration of the partition/split function as the next highest order bit of the external inode number is checked against the fset mask and internal inode mask, up to the point where iBit is larger then the highest order bit of the external inode number. When the iBit value is not greater than the external inode number, the utility checks, at block 708, whether the iBit (bit position) is set in the fset mask. When that check returns a positive result, the utility then checks at block 710 whether the iBit is set (i.e., value=1) in the external inode number. If the iBit is set in the external inode number, the utility sets the fBit in the fileset ID (block 712), and then left shifts (fBit) to the next higher order bit in fset mask (block 714). The left shifting function increases the value of the bit number by 1, in numeric sequence (e.g., bit1, bit2, bit3, . . . ). However, if at decision block 710 the iBit is not set in the external inode number, the utility simply executes the left shift of the fBit, leaving a zero value in that previous bit of the fileset ID. With the value of the fBit in the fset mask determined, the utility the left shifts the iBit, thus selecting the next higher order (in sequence) bit to be processed with the partition/split function.

Returning now to decision block 708, when the iBit is not set in the fset mask, the utility recognizes that the iBit of the external inode number is set within the internal inode mask, and the utility determines at block 718 whether the iBit is set the external inode number. When the iBit is set in the internal inode mask, the utility sets the jBit in the internal inode number to 1 (block 720), then left shifts the jBit (block 722). However, when the iBit is not set in the external inode number, the utility simply left shifts the jBit, leaving a zero in the previous jBit position of the internal inode number (block 722). The utility then left shifts the iBit (block 716) before checking whether the iBit is greater than the number of bits of the external inode number (block 701). When block 706 evaluates as true, the utility outputs the determined fileset ID and internal inode number values to the requesting process/application (block 724), and the method ends at termination block 726.

Figure 8:
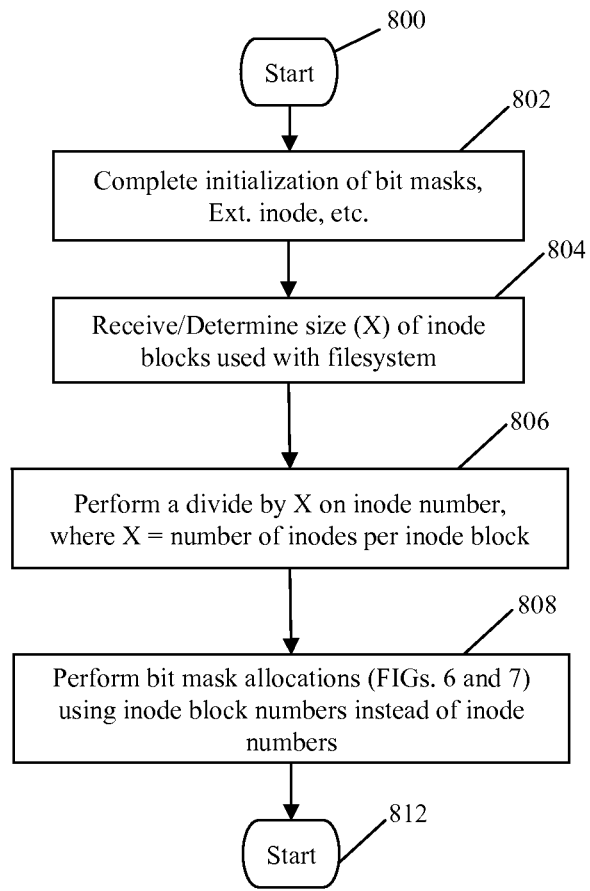
FIG. 8 is a flow chart illustrating the method for performing the dynamic inode bit mask generation process to accommodate file systems where the inode block sizes (number of inodes per block) is not a power of two (2), according to one embodiment.

With reference now to FIG. 8, there is illustrated an example method by which the processes described above with respect to inodes that are allocated in blocks containing a pre-set number of inodes. In the illustrative embodiments, single inodes are illustrated within the inode files arranged in ranges of four inodes. It is however, appreciated that in practical implementation, the inodes are allocated in blocks of inodes (as a design feature of the file system). The size of the blocks is not dynamically variable; however, the size of the inode blocks can be configured (at filesystem initialization time) such that the size may not be a number of inodes that is an exact power of two (2) ($2^x$, where x is an integer). In order accommodate these variability in inode block size implementation, an enhancement to the above described processes enables mapping within the inode space at a block level, rather than in individual inode level. The embodiments described support the desirability of mapping inode numbers to filesets in such a way that all inodes in a single inode block belong to the same fileset. The mapping function specified provides this condition when the number of inodes per inode block is a power of two, where the x low-order bits of the mask mj are all set to 1. To accommodate file systems with other blocks sizes, where the number of inodes per inode block is not a power of 2, the utility provides a pre-mapping function that maps the inode space for a fileset based on the inode block numbers instead of the individual inode numbers. Thus, if X is the number of inodes per inode block, the modified mapping function of the utility is defined with the following code segment:

```
unsigned ExtIno(unsigned f, unsigned j)
{
return X * extino(f, j/X) + (j % X);
}
```

The application of the above modification is shown by the flow chart of FIG. 8, which begins at initiation block 800. The utility completes the various initialization processes, of setting the two bit masks to zero or to an initial value (block 802). The utility then receives/determines the size X of the inode blocks pre-set for use within the filesystem (block 804). To support this block size allocation of inodes, the utility then performs a divide by X on the inode number (block 806). This division occurs for all filesets, regardless of whether the number of inodes per block, X, is an exact power of two. With this block size division completed, the utility proceeds with the bit mask allocations as provided in FIG. 6, described above, utilizing inode block size allocations (block 808). The process then ends at termination block 810.

Figure 5B:
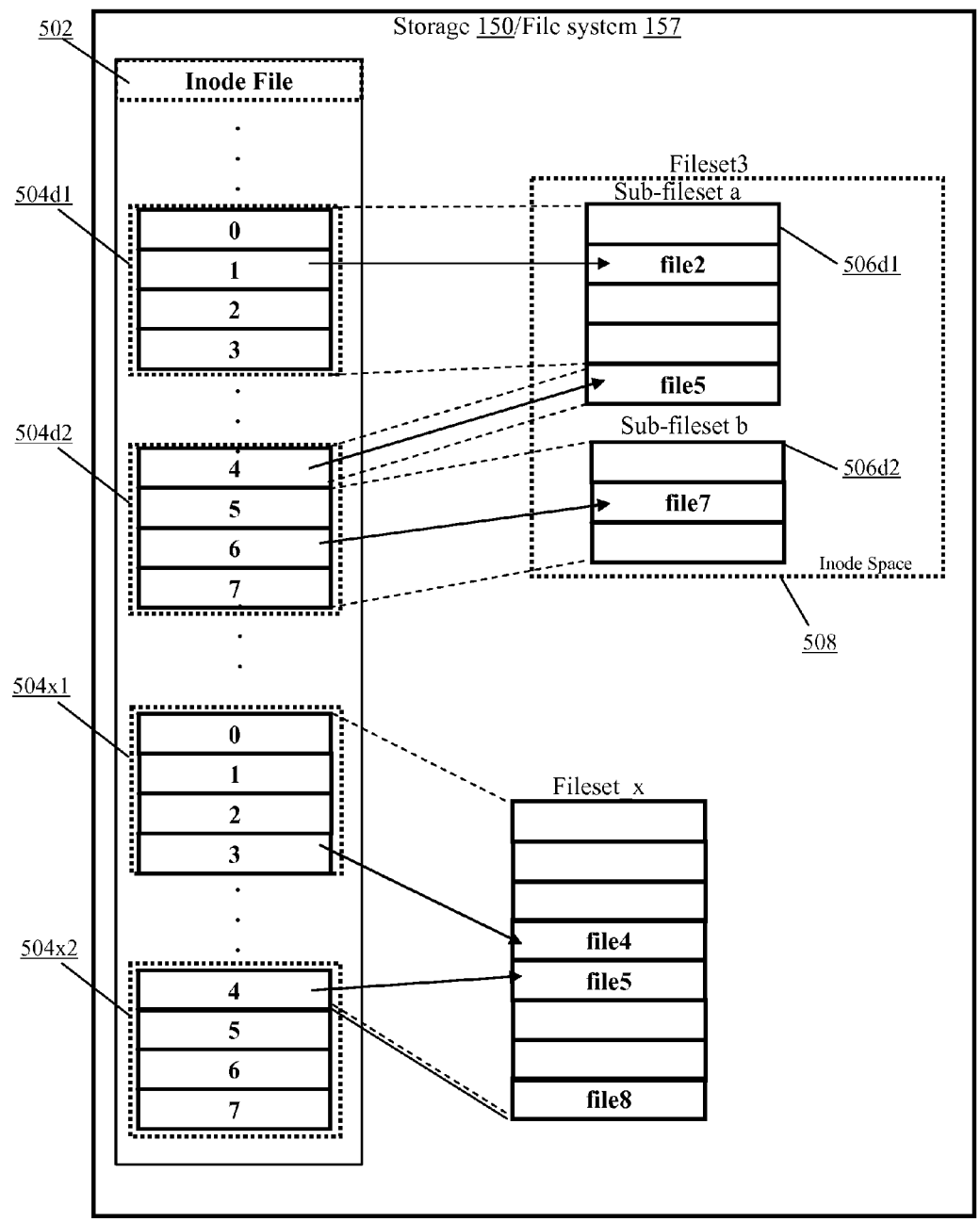
FIG. 5B is a block diagram representation of a storage system with inode file space and corresponding fileset(s) and sub-filesets sharing a fileset ID and the inode spaces of a previously stored fileset, in accordance with one embodiment.
Figure 9:
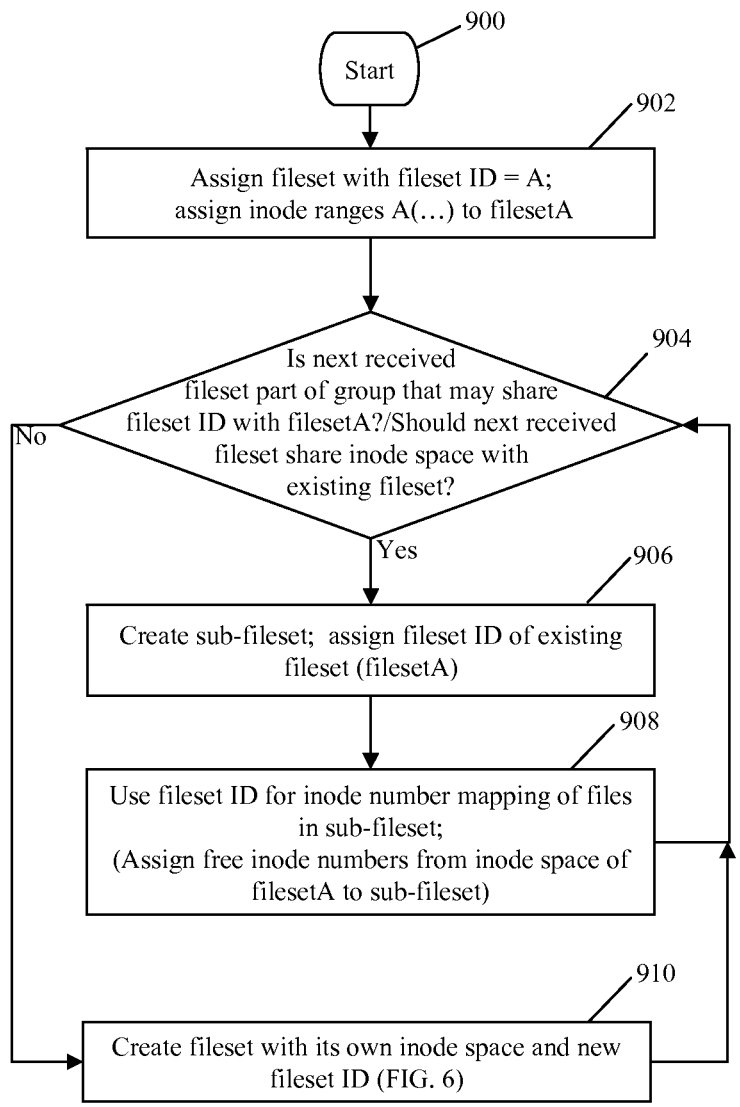
FIG. 9 is a flow chart illustrating the method by which multiple sub-filesets are allocated a same fileset ID and share a same inode space as a previously allocated fileset, in accordance with one embodiment.

Turning now to FIG. 9 and also referring back to FIG. 5B, there is illustrated a method by which multiple sub-filesets (i.e., a group of related filesets that do not require their own unique inode space), may share a single fileset ID and be allocated inodes with the inode space assigned to that fileset ID. In the previously described embodiments, each fileset is assigned its own inode space (comprising one or more inode ranges). In FIG. 5B, fileset3 506*d* comprises sub-fileset a 506*d*1 and sub-fileset b 506*d*2 within inode space 508. Fileset3 506*d* is assigned two inode ranges 504*d*1 and 504*d*2 of eight inodes. The eight inodes within inode ranges 504*d*1 and 504*d*2 are assigned arbitrarily to files within sub-fileset a 506*d*1 and sub-fileset b 506*d*2. The dashed lines and arrows connecting the inodes with specific files within sub-fileset a 506*d*1 and sub-fileset b 506*d*2 illustrates that the inode space is shared between the sub-filesets, which may have different numbers of files. Fileset x is also illustrated to contrast the use of an inode space with sub-filesets versus a Fileset having its own exclusive inode space, inode ranges 504*x*1 and 504*x*2. The inode space is therefore a set of inode numbers returned by the above presented and described extino( ) function for a single value of the fileset parameter, f (i.e., for a single fileset ID).

In one embodiment, the process of assigning an inode space to a Fileset ID that is then utilized to map multiple sub-filesets is accommodated by the DRIEVA utility performing the method illustrated by FIG. 9. As provided, the method begins with initiation block 900, and then proceeds to block 902 at which an "inode space" (comprising inode ranges A) is assigned to a new fileset (fileset ID=A) that is created. The new fileset is assigned fileset ID of fileset A (with A representing a numeric value). A check is made at decision block 904 whether the next received fileset for inode mapping is a part of a group that may share fileset A as their fileset ID. This determination also determines if the next received fileset is to share inode space with an existing fileset. When the fileset is part of the group that may share fileset A as their fileset ID, the utility creates a sub-fileset association of the next received fileset to the existing fileset A to allow the sub-fileset to share an inode space assigned to fileset A (block 906). Then, the inode mapping function assigns free/unassigned inode numbers from within the inode space to the files of the sub-fileset (block 908). Thus, all sub-filesets that are within the same inode space are intermingled within the same set of inode numbers. When the next fileset received for inode mapping is not intended to share a fileset ID with an existing fileset, the utility assigns a unique inode space for the fileset, which is provided its own fileset ID (block 910).

The above embodiment recognizes that for some applications, it may be useful to allow some subset of filesets to share the same set of inode numbers. In this scenario, the same inode space is assigned to a subset of filesets (referred to as sub-filesets) instead of being assigned to a single fileset. For example, a file system may contain groups of related projects with filesets that can be managed as a group instead of managing each fileset individually. In this scenario, logically grouping the inodes for these filesets within a single fileset space provides some synergistic benefits. Sharing inode spaces reduces the total number of inode spaces, which simplifies space management.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having a processor and access to a storage facility on which one or more filesets are stored, a computer-implemented method that enables efficient tracking of fileset identifiers (IDs) and inode numbers, the method comprising:
a processor initializing a fileset mask to a first value and an internal inode mask to a second value;
dynamically updating the fileset mask to enable a mapping of the number of one (1) bits in the fileset mask to a fileset ID corresponding to a number of filesets received for storage on the storage facility;
dynamically updating the internal inode mask to enable a mapping of the internal inode mask's one (1) bits to at least a maximum number of inodes required by the number of filesets, wherein the number of one (1) bits within the fileset mask and the internal inode mask are disjoint relative to each other; and
mapping an external inode number to a corresponding fileset by concatenating individual bits of the external inode number corresponding to each bit within the fileset mask that is set to one (1) to generate the fileset ID;
wherein the fileset mask is a sequence of binary values in which each bit that is set to one (1) represents a bit in an external inode number that is to be utilized to determine the fileset ID being referenced by the external inode number; and
wherein the internal inode mask is a sequence of binary values in which each bit that is set to one (1) represents a bit in an external inode number that is to be utilized to determine the internal inode number of a corresponding fileset being referenced by the external inode number.

2. The method of claim 1, further comprising:
mapping the external inode number to a corresponding internal inode number of the fileset by concatenating individual bits of the external inode number corresponding to each bit within the internal inode mask that is set to one (1) to generate the internal inode number.

3. The method of claim 1, further comprising:
for a first received fileset, allocating an initial number, s, of lower order bits of the internal inode mask to identify a first size, $2^s$, of an internal inode space that is required to identify the individual files associated with the first received fileset;
setting the first n lower order bits of the internal inode mask to one (1); and
in response to receiving a next fileset to store within the storage facility:
evaluating a function of two (2) raised to the power of a present count of one (1) bits within the fileset mask (f), ($2^f$), which represents a maximum number of filesets that can be individually tracked with f one (1) bits set within the fileset mask;
determining whether the next fileset increases a total count of filesets being tracked by the fileset mask to greater than $2^f$; and
in response to the next fileset not increasing the total count of filesets to greater than $2^f$:
storing the fileset with a fileset ID corresponding to the value of the total count; and
continuing to track the fileset with the fileset mask having f one (1) bits set.

4. The method of claim 3, further comprising:
in response to the next fileset increasing the total count of filesets to greater than 2f:
setting a next unallocated bit within the fileset mask that is not set within the internal inode mask to one (1); and
assigning a next $2^f$ fileset IDs with a value corresponding to the number of one (1) bits within the fileset mask.

5. The method of claim 4, wherein the setting further comprises:
logically ORing the fileset mask and the internal inode mask to generate a binary value having a series of lower order 1 bits;
left shifting past the series of lower order 1 bits within the binary value to a first unallocated (0) bit; and
setting a bit within the fileset mask corresponding to the first unallocated bit to one (1), wherein intervening bits that are not set to one represent zero (0) bits and f increments to f+1.

6. The method of claim 3, further comprising:
evaluating a function of two (2) raised to the power of a present count of one (1) bits within the internal inode mask (j), ($2^j$), which represents a maximum number of inodes that are individually addressable within inode space allocated within an inode file to each previously stored fileset;

determining whether the next fileset requires a total number of inodes that is greater than $2^j$; and in response to the next fileset not requiring a total number of inodes greater than $2^j$:

assigning files of the fileset to the inodes provided within the inode space allocated to the fileset utilizing one or more internal inode numbers determined by the internal inode mask; and continuing to track a number of internal inode numbers required for each received fileset utilizing the internal inode mask having j one (1) bits set.

7. The method of claim 6, further comprising:

setting a next unallocated bit within the internal inode mask that is not set within the fileset mask to one (1);

assigning, within the inode file, a next inodes to each inode space of each previously received fileset and to the next fileset; and storing the next fileset with an inode space equal to $2^{(j+1)}$.

8. The method of claim 7, wherein the setting further comprises:

logically ORing the fileset mask and the internal inode mask to generate a binary value having a series of lower order 1 bits;

left shifting past the series of lower order 1 bits within the binary value to a first unallocated (0) bit; and setting a bit within the internal inode mask corresponding to the first unallocated bit to one (1), wherein intervening bits that are not set to one represent zero (0) bits and j increments to j+1.

9. The method of claim 7, further comprising:

allocating an inode space of a fileset as one or more inode ranges, wherein each range represents a smallest number of inodes that can be assigned to the fileset; and in response to the next fileset requiring a total number of inodes greater than $2^j$, allocating within the inode file, one or more additional inode ranges to each previously stored fileset to double a previous allocation of inode ranges per fileset;

wherein the allocation of inode ranges for a fileset within the inode file is not necessarily sequential; and wherein filesets that do not utilize their additional inode ranges are provided with the additional inode ranges as reserve inode space to enable the fileset to increase the number of files within the fileset.

10. The method of claim 1, further comprising:

retrieving an inode block size established for the file system;

determining how many inodes can be stored in a block by considering the inode size;

dividing the inode number by the number of inodes per inode block to generate an inode block number; and performing the mapping between the external inode number and the internal inode number using the internal inode mask and the inode block number in lieu of the inode number.

11. The method of claim 1, further comprising:

identifying a received fileset as a sub-fileset;

assigning the sub-fileset to a same fileset ID as a previously stored fileset;

sharing an inode space of the previously stored fileset with the sub-fileset; and assigning one or more unassigned inode numbers from within the inode space of the previously stored fileset to respective one or more files of the sub-fileset.

12. A data processing system comprising:

a processor;

a storage facility accessible to the processor; and a file storage and management facility on which one or more filesets are stored; and a utility executing on the processor that causes the data processing system to:

initialize a fileset mask to a first value and an internal inode mask to a second value;

dynamically update the fileset mask to enable a mapping of the number of one (1) bits in the fileset mask to a fileset identifier (ID) corresponding to a number of filesets received for storage on the storage facility;

dynamically update the internal inode mask to enable a mapping of the internal inode mask's one (1) bits to at least a maximum number of inodes required by the number of filesets received for storage on the storage facility, wherein the number of one (1) bits within the fileset mask and the internal inode mask are disjoint relative to each other;

map an external inode number to a corresponding fileset by concatenating individual bits of the external inode number corresponding to each bit within the fileset mask that is set to one (1) to generate the fileset ID; and map the external inode number to a corresponding internal inode number of the fileset by concatenating individual bits of the external inode number corresponding to each bit within the internal inode mask that is set to one (1) to generate the internal inode number;

wherein the fileset mask is a sequence of binary values in which each bit that is set to one (1) represents a bit in an external inode number that is to be utilized to determine the fileset ID being referenced by the external inode number; and wherein the internal inode mask is a sequence of binary values in which each bit that is set to one (1) represents a bit in an external inode number that is to be utilized to determine the internal inode number of a corresponding fileset being referenced by the external inode number.

13. The data processing system of claim 12, wherein the utility further causes the data processing system to:

for a first received fileset, allocate an initial number, s, of lower order bits of the internal inode mask to identify a first size, $2^s$, of internal inode space that is required to identify the individual files associated with the first received fileset;

set the first n lower order bits of the internal inode mask to one (1);

in response to receiving a next fileset to store within the storage facility:

evaluate a function of two (2) raised to the power of a present count of one (1) bits within the fileset mask (f), ($2^f$), which represents a maximum number of filesets that can be individually tracked with f one (1) bits set within the fileset mask;

determine whether the next fileset increases a total count of filesets being tracked by the fileset mask to greater than $2^f$; and in response to the next fileset not increasing the total count of filesets to greater than $2^f$: store the fileset with a fileset ID corresponding to the value of the total count; and continuing to track the fileset with the fileset mask having f one (1) bits set.

14. The data processing system of claim 12, wherein the utility further causes the data processing system to:
in response to the next fileset increasing the total count of filesets to greater than 2f:
set a next unallocated bit within the fileset mask that is not set within the internal inode mask to one (1), wherein the setting comprises:
logically OR the fileset mask and the internal inode mask to generate a binary value having a series of lower order 1 bits;
left shift past the series of lower order 1 bits within the binary value to a first unallocated (0) bit; and
set a bit within the fileset mask corresponding to the first unallocated bit to one (1), wherein intervening bits that are not set to one represent zero (0) bits and f increments to f+1; and
assign a next $2^f$ fileset IDs with a value corresponding to the number of one (1) bits within the fileset mask.

15. The data processing system of claim 13, wherein the utility further causes the data processing system to:
evaluate a function of two (2) raised to the power of a present count of one (1) bits within the internal inode mask (j), ($2^j$), which represents a maximum number of inodes that are individually addressable within inode space allocated within an inode file to each previously stored fileset;
determine whether the next fileset requires a total number of inodes that is greater than $2^j$; and
in response to the next fileset not requiring a total number of inodes greater than $2^j$:
assign files of the fileset to the inodes provided within the inode space allocated to the fileset utilizing one or more internal inode numbers determined by the internal inode mask; and
continue to track a number of internal inode numbers required for each received fileset utilizing the internal inode mask having j one (1) bits set.

16. The data processing system of claim 15, wherein the utility further causes the data processing system to:
in response to the next fileset requiring a total number of inodes greater than $2^j$:
set a next unallocated bit within the internal inode mask that is not set within the fileset mask to one (1), wherein the setting further comprises:
logically OR the fileset mask and the internal inode mask to generate a binary value having a series of lower order 1 bits;
left shift past the series of lower order 1 bits within the binary value to a first unallocated (0) bit; and
set a bit within the internal inode mask corresponding to the first unallocated bit to one (1), wherein intervening bits that are not set to one represent zero (0) bits and j increments to j+1;
assign, within the inode file, a next inodes to each inode space of each previously received fileset and to the next fileset; and
store the next fileset with an inode space equal to $2^{(j+1)}$.

17. The data processing system of claim 16, wherein the utility further causes the data processing system to:
allocate an inode space of a fileset as one or more inode ranges, wherein each range represents a smallest number of inodes that can be assigned to the fileset; and
in response to the next fileset requiring a total number of inodes greater than $2^j$, allocate within the inode file, one or more additional inode ranges to each previously stored fileset to double a previous allocation of inode ranges per fileset;
wherein the allocation of inode ranges for a fileset within the inode file is not necessarily sequential; and
wherein filesets that do not utilize their additional inode ranges are provided with the additional inode ranges as reserve inode space to enable the fileset to increase the number of files within the fileset.

18. The data processing system of claim 12, wherein the utility further causes the data processing system to:
retrieve an inode block size established for the file system;
determine how many inodes can be stored in a block by considering the inode size;
divide the inode number by the number of inodes per inode block to generate an inode block number; and
perform the mapping between the external inode number and the internal inode number using the internal inode mask and the inode block number in lieu of the inode number.

19. The data processing system of claim 12, wherein the utility further causes the data processing system to:
identify a received fileset as a sub-fileset;
assign the sub-fileset to a same fileset ID as a previously stored fileset;
share an inode space of the previously stored fileset with the sub-fileset; and
assign one or more unassigned inode numbers from within the inode space of the previously stored fileset to respective one or more files of the sub-fileset.

20. A computer program product comprising:
a computer usable storage device; and
program code embedded on the computer usable storage device that when executed by a processor of a data processing system having access to a file storage and management facility performs the following functions:
initializing a fileset mask to a first value and an internal inode mask to a second value;
dynamically updating the fileset mask to enable a mapping of the number of one (1) bits in the fileset mask to a fileset identifier (ID) corresponding to a number of filesets received for storage on the storage facility;
dynamically updating the internal inode mask to enable a mapping of the internal inode mask's one (1) bits to at least a maximum number of inodes required by the filesets received for storage on the storage facility, wherein the one (1) bits within the fileset mask and the internal inode mask are disjoint relative to each other;
mapping an external inode number to a corresponding fileset by concatenating individual bits of the external inode number corresponding to each bit within the fileset mask that is set to one (1) to generate the fileset ID; and
mapping the external inode number to a corresponding internal inode number of the fileset by concatenating individual bits of the external inode number corresponding to each bit within the internal inode mask that is set to one (1) to generate the internal inode number;
wherein the fileset mask is a sequence of binary values in which each bit that is set to one (1) represents a bit in an external inode number that is to be utilized to determine the fileset ID being referenced by the external inode number; and
wherein the internal inode mask is a sequence of binary values in which each bit that is set to one (1) represents a bit in an external inode number that is to be utilized to determine the internal inode number of a corresponding fileset being referenced by the external inode number.

21. The computer program product of claim 20, wherein the program code further provides the following functions:
for a first received fileset, allocating an initial number, s, of lower order bits of the internal inode mask to identify a first size, $2^s$, of internal inode space that is required to identify the individual files associated with the first received fileset;
setting the first n lower order bits of the internal inode mask to one (1);
in response to receiving a next fileset to store within the storage facility:
evaluating a function of two (2) raised to the power of a present count of one (1) bits within the fileset mask (f), ($2^f$), which represents a maximum number of filesets that can be individually tracked with f one (1) bits set within the fileset mask;
determining whether the next fileset increases a total count of filesets being tracked by the fileset mask to greater than $2^f$;
in response to the next fileset not increasing the total count of filesets to greater than $2^f$:
storing the fileset with a fileset ID corresponding to the value of the total count; and
continuing to track the fileset with the fileset mask having f one (1) bits set;
in response to the next fileset increasing the total count of filesets to greater than 2f:
setting a next unallocated bit within the fileset mask that is not set within the internal inode mask to one (1), wherein the setting comprises:
logically ORing the fileset mask and the internal inode mask to generate a binary value having a series of lower order 1 bits;
left shifting past the series of lower order 1 bits within the binary value to a first unallocated (0) bit; and
setting a bit within the fileset mask corresponding to the first unallocated bit to one (1), wherein intervening bits that are not set to one represent zero (0) bits and f increments to f+1; and
assigning a next $2^f$ fileset IDs with a value corresponding to the number of one (1) bits within the fileset mask.

22. The computer program product of claim 21, wherein the program code further provides the following functions:
evaluating a function of two (2) raised to the power of a present count of one (1) bits within the internal inode mask (j), ($2^j$), which represents a maximum number of inodes that are individually addressable within inode space allocated within an inode file to each previously stored fileset;
determining whether the next fileset requires a total number of inodes that is greater than $2^j$;
in response to the next fileset not requiring a total number of inodes greater than $2^j$:
assigning files of the fileset to the inodes provided within the inode space allocated to the fileset utilizing one or more internal inode numbers determined by the internal inode mask; and
continuing to track a number of internal inode numbers required for each received fileset utilizing the internal inode mask having j one (1) bits set;
in response to the next fileset requiring a total number of inodes greater than $2^j$, the utility further provides the following functions:
setting a next unallocated bit within the internal inode mask that is not set within the fileset mask to one(1), wherein the setting further comprises:
logically ORing the fileset mask and the internal inode mask to generate a binary value having a series of lower order 1 bits;
left shifting past the series of lower order 1 bits within the binary value to a first unallocated (0) bit; and
setting a bit within the internal inode mask corresponding to the first unallocated bit to one (1), wherein intervening bits that are not set to one represent zero (0) bits and j increments to j+1;
assigning, within the inode file, a next inodes to each inode space of each previously received fileset and to the next fileset; and
storing the next fileset with an inode space equal to $2^{(j+1)}$.

23. The computer program product of claim 22, wherein the program code further provides the following functions:
allocating an inode space of a fileset as one or more inode ranges, wherein each range represents a smallest number of inodes that can be assigned to the fileset; and
when the next fileset requires a total number of inodes greater than $2^j$, allocating within the inode file, one or more additional inode ranges to each previously stored fileset to double a previous allocation of inode ranges per fileset;
wherein the allocation of inode ranges for a fileset within the inode file is not necessarily sequential; and
wherein filesets that do not utilize their additional inode ranges are provided with the additional inode ranges as reserve inode space to enable the fileset to increase the number of files within the fileset.

24. The computer program product of claim 20, wherein the program code further provides the following functions:
retrieving an inode block size established for the file system;
determining how many inodes can be stored in a block by considering the inode size;
dividing the inode number by the number of inodes per inode block to generate an inode block number; and
performing the mapping between the external inode number and the internal inode number using the internal inode mask and the inode block number in lieu of the inode number.

25. The computer program product of claim 20, wherein the program code further provides the following functions:
identifying a received fileset as a sub-fileset;
assigning the sub-fileset to a same fileset ID as a previously stored fileset;
sharing an inode space of the previously stored fileset with the sub-fileset; and
assigning one or more unassigned inode numbers from within the inode space of the previously stored fileset to respective one or more files of the sub-fileset.

* * * * *